United States Patent
Adachi et al.

(10) Patent No.: US 6,597,428 B1
(45) Date of Patent: Jul. 22, 2003

(54) METHOD AND APPARATUS FOR FORMING PHOTOGRAPHIC IMAGES

(75) Inventors: Yoshihiro Adachi, Tokyo (JP); Kazushige Uenaka, Tokyo (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/113,557

(22) Filed: Jul. 10, 1998

(30) Foreign Application Priority Data

Jul. 10, 1997 (JP) .............................. 9-185260

(51) Int. Cl.⁷ ..................... G03B 27/52; G03B 27/32; G03B 27/44
(52) U.S. Cl. .............................. 355/40; 355/32; 355/54; 355/77
(58) Field of Search .............................. 355/22, 32, 35, 355/37, 38, 40, 18, 77, 54; 399/39, 45; 358/302

(56) References Cited

U.S. PATENT DOCUMENTS

| | | | |
|---|---|---|---|
| 5,739,922 A | 4/1998 | Matama | 358/447 |
| 5,809,366 A | * 9/1998 | Yamakawa et al. | 399/39 |
| 5,828,461 A | * 10/1998 | Kubo et al. | 355/38 |

FOREIGN PATENT DOCUMENTS

| | | | |
|---|---|---|---|
| EP | 0 310829 A2 | 4/1989 | |
| EP | 0 310829 A3 | 2/1990 | |
| GB | 2 191 655 A | 12/1987 | |
| JP | 49-209 | 1/1974 | .......... G03G/13/16 |
| JP | 49-38172 | 10/1974 | .......... G03G/13/22 |
| JP | 54-21095 | 7/1979 | .............. B41J/3/04 |
| JP | 59-121348 | 7/1984 | .......... G03G/13/00 |
| JP | 59-225984 | 12/1984 | ............ B41M/5/00 |
| JP | 62-56149 | 3/1987 | .............. B41J/3/04 |
| JP | 62-111782 | 5/1987 | ............ B41M/5/00 |

(List continued on next page.)

Primary Examiner—Russell Adams
Assistant Examiner—Peter B. Kim
(74) Attorney, Agent, or Firm—Sughrue Mion, PLLC

(57) ABSTRACT

A standard color image and at least one processed image are printed on a single sheet of photosensitive material. The standard color image is obtained by carrying out standard image processing on a single original color image. The processed image is obtained by carrying out image processing under different processing conditions on the original color image. The different processing conditions may be the processing conditions for altering an image tone, image sharpness, image gradation, image trimming, an image size enlargement scale factor, or a combination of at least two of them. Various prints, which are obtained from image processings carried out by setting the processing conditions to various different processing conditions, can thus be seen easily.

25 Claims, 6 Drawing Sheets

FOREIGN PATENT DOCUMENTS

| | | | |
|---|---|---|---|
| JP | 62-206567 | 9/1987 | G03G/15/01 |
| JP | 63-134250 | 6/1988 | B41J/3/04 |
| JP | 64-47553 | 2/1989 | B41J/3/04 |
| JP | 1-170672 | 7/1989 | C09D/11/00 |
| JP | 1-59111 | 12/1989 | B41J/3/04 |
| JP | 2-14905 | 4/1990 | B41J/2/52 |
| JP | 2-276871 | 11/1990 | C09D/11/00 |
| JP | 2-278276 | 11/1990 | G03G/15/16 |
| JP | 3-231859 | 10/1991 | B41J/2/205 |
| JP | 3-258870 | 11/1991 | C09D/11/00 |
| JP | 4-81786 | 3/1992 | G03G/15/16 |
| JP | 4-117468 | 4/1992 | C09D/11/00 |
| JP | 4-501925 | 4/1992 | G03G/15/20 |
| JP | 4-147259 | 5/1992 | G03D/3/13 |
| JP | 4-155333 | 5/1992 | G03D/3/00 |
| JP | 4-199052 | 7/1992 | G03D/15/00 |
| JP | 4-214781 | 8/1992 | C09D/11/00 |
| JP | 4-248879 | 9/1992 | C09D/11/02 |
| JP | 4-337747 | 11/1992 | G03G/15/00 |
| JP | 5-500869 | 2/1993 | G03G/15/20 |
| JP | 5-57893 | 3/1993 | B41J/2/045 |
| JP | 5-162473 | 6/1993 | B41M/5/40 |
| JP | 5-46744 | 7/1993 | H04N/1/23 |
| JP | 5-238006 | 9/1993 | B41J/2/015 |
| JP | 5-281863 | 10/1993 | G03G/15/16 |
| JP | 5-82939 | 11/1993 | G03G/7/00 |
| JP | 5-333662 | 12/1993 | G03G/15/01 |
| JP | 5-341666 | 12/1993 | G03G/15/16 |
| JP | 6-98184 | 4/1994 | H04N/1/46 |
| JP | 6-106861 | 4/1994 | B41M/5/30 |
| JP | 6-161050 | 6/1994 | G03C/3/00 |
| JP | 6-256696 | 9/1994 | C09D/11/00 |
| JP | 7-29446 | 4/1995 | B41J/2/205 |
| JP | 7-179032 | 7/1995 | B41M/5/00 |
| JP | 8-99472 | 4/1996 | B41M/5/38 |
| JP | 8-104837 | 4/1996 | C09D/11/00 |
| JP | 8-163363 | 6/1996 | H04N/1/405 |
| JP | 8-194349 | 7/1996 | G03G/15/01 |
| JP | 8-194394 | 7/1996 | G03G/15/16 |
| JP | 8-224966 | 9/1996 | B41M/5/38 |
| JP | 8-276673 | 10/1996 | B41M/5/38 |
| JP | 9-114011 | 5/1997 | G03B/27/62 |
| JP | 9-114016 | 5/1997 | G03B/27/62 |
| JP | 9-114017 | 5/1997 | G03B/27/62 |
| JP | 9-120104 | 5/1997 | G03B/27/62 |
| JP | 9-121269 | 5/1997 | H04N/1/113 |
| JP | 9-130557 | 5/1997 | G03B/27/62 |
| WO | WO 92/05470 | 4/1992 | |

* cited by examiner

F I G. 3
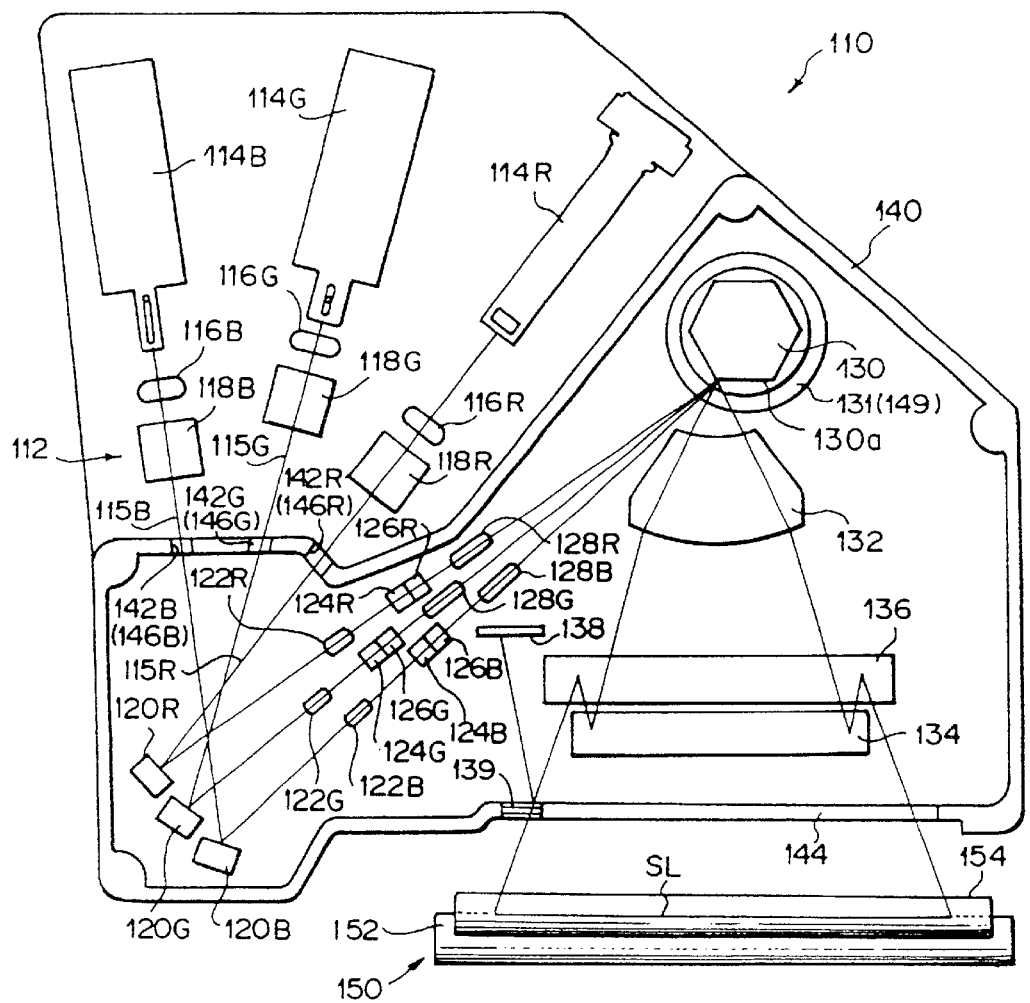

METHOD AND APPARATUS FOR FORMING PHOTOGRAPHIC IMAGES

BACKGROUND OF THE INVENTION

1. Field of the Invention

This invention relates to a method and apparatus for forming photographic images, a recording medium for use in the method, and photographic images formed with the method. This invention particularly relates to a method and apparatus for printing a plurality of photographic images, which have been obtained from various different kinds of image processings, on a photosensitive material or displaying the plurality of the photographic images on a display device, a recording medium, on which a program for the method has been recorded, and photographic images formed with the method.

2. Description of the Prior Art

Ordinarily, when photographs are taken and the negative film is given to a photo processing shop, the negative film is subjected to a predetermined developing process and a predetermined printing process, and color photographs having been printed under standard conditions are furnished to the photographer. In processing laboratories and miniature development laboratories, the processes, which are ordinarily considered as being optimum, are carried out under standard processing conditions (negative image developing conditions and printing exposure conditions) having been set previously, such that prints coming up to expectations of photographers may be furnished. However, for some photographs, it is often desired that the processes be carried out under conditions different from the standard processing conditions. For example, as for tones and gradation, it is often desired that photographs, which are more bluish or reddish than the standard tone, and photographs, which are lighter or darker than the standard gradation, can be obtained.

Recently, digital photograph techniques have became popular. With the digital photograph techniques, a digital image signal can be transformed in various desired ways by image processing. Therefore, tones, gradation, and sharpness (the degree of emphasis of sharpness and edges) can be altered. Also, soft focus processing for blurring an image as a whole and center focus processing for rendering only the center portion of an image sharp and blurring the peripheral regions can be carried out. Further, a portion of an image can be enlarged as in conventional enlargement, and effects equivalent to those of variable power photographing can thereby be obtained. Specifically, the results equivalent to those with the variable power photographing can be obtained by combining the image size enlargement and the trimming with each other. In this manner, from an image signal having been obtained from a single time of photographing, various variations of photographic images can be obtained with various kinds of image processings.

As described above, recently, photographs can be printed under processing conditions different from the standard processing conditions, which have been set previously. However, ordinary users cannot clearly find what finish each of the various variations yields. Therefore, the various variations, which enhance the enjoyment of photographs, have not heretofore been utilized sufficiently.

Accordingly, there is a strong demand for a method, with which the variations of prints obtained from image processings that are carried out by setting the processing conditions to various different processing conditions can be experienced easily.

SUMMARY OF THE INVENTION

The primary object of the present invention is to provide a method of forming photographic images, with which various prints obtained from image processings that are carried out by setting the processing conditions to various different processing conditions can be experienced easily.

Another object of the present invention is to provide an apparatus for carrying out the method of forming photographic images.

A further object of the present invention is to provide a recording medium, which records a program for the method of forming photographic images.

A still further object of the present invention is to provide prints formed with the method of forming photographic images.

The image processings, which are carried out by setting the processing conditions to various different processing conditions, are not limited to the processing for altering the tones and gradation (including the image density), and include the processing for altering the sharpness (the degree of emphasis of sharpness and edges), the blurring processing, such as the soft focus processing and the center focus processing, and the enlargement processing. The image processings also include the processing for printing a color photograph as a black-and-white image or an image with a sepia tone. (The term "tone" as used herein also includes the black and white and the sepia tone.)

Recently, research of digital photo printers has been carried out. With the digital photo printers, an image having been recorded on photographic film (hereinbelow referred to as the film), such as negative film or reversal film, or on printed matter is photoelectrically read out, and an image signal having thus been obtained is converted into a digital signal. The digital signal is then subjected to various kinds of image processing, and a processed image signal is thereby obtained. Thereafter, recording light is modulated with the processed image signal, and a photosensitive material, such as photographic paper, is scanned with and exposed to the modulated recording light. In this manner, a visible image is printed on the photosensitive material. With the digital photo printers, layouts of printed images, such as combining of a plurality of images, division of an image, and editing of characters and images, and various kinds of image processing, such as color/image density adjustment, conversion of magnification, and contour emphasis, can be carried out freely. Therefore, prints having been edited and processed freely in accordance with applications of the prints can be obtained. Also, in cases where the conventional surface exposure techniques are employed, the image density information having been recorded on film, or the like, cannot be reproduced perfectly due to limitation imposed upon the reproducible image density range of photosensitive materials. However, with the digital photo printers, prints can be obtained such that the image density information having been recorded on film, or the like, can be reproduced approximately perfectly. The term "photographic image" as used herein also includes the photographs, which are printed by the digital photo printers.

As a technique for simultaneously obtaining images under various different image processing conditions, for example, it may be considered to divide the optical path of an image projecting optical system into at least two optical paths, and to insert a filter or an optical system into one of the optical paths. However, such a technique has the problems in that the width, over which the conditions can be altered, cannot be kept large, and alteration to different kinds of processing conditions cannot be carried out easily. For example, with respect to the sharpness, and the like, the alteration of the processing conditions is almost impossible.

The present invention provides a method of forming photographic images, wherein the improvement comprises the steps of printing a standard color image and at least one processed image on a single sheet of photosensitive material, the standard color image being obtained by carrying out standard image processing on a single original color image, the processed image being obtained by carrying out image processing under different processing conditions on the original color image.

By way of example, the different processing conditions may be the processing conditions for altering an image tone, image sharpness, image gradation, image trimming, or an image size enlargement scale factor. Alternatively, the different processing conditions may be the processing conditions for altering a combination of at least two of an image tone, image sharpness, image gradation, image trimming, and an image size enlargement scale factor. Also, the original color image may be a negative image, which has been recorded on a negative film, or may be given as a digital image signal. In cases where the original color image is given as a digital image signal, the different processing conditions are the conditions of image processing, which is carried out on the digital image signal.

The present invention also provides an apparatus for forming photographic images, wherein the improvement comprises the provision of means for forming a standard color image and at least one non-standard color image on a single sheet of photosensitive material, the standard color image being obtained by carrying out standard image processing on a single original color image, the non-standard color image being obtained by carrying out image processing under different processing conditions on the original color image.

With the method and apparatus for forming photographic images in accordance with the present invention, it is possible to obtain photographic images, comprising a standard color image and at least one processed image, which are printed on a single sheet of photosensitive material, the standard color image being obtained by carrying out standard image processing on a single original color image, the processed image being obtained by carrying out image processing under different processing conditions on the original color image.

The method of forming photographic images in accordance with the present invention can be carried out by the utilization of a recording medium, on which a program for printing a standard color image and at least one processed image on a single sheet of photosensitive material has been recorded, the standard color image being obtained by carrying out standard image processing on a single original color image, the processed image being obtained by carrying out image processing under different processing conditions on the original color image. Specifically, the method of forming photographic images in accordance with the present invention can be carried out by the utilization of a recording medium, such as a CD-ROM, which records a program for carrying out standard image processing on a single original color image, a program for carrying out image processing under different processing conditions on the original color image, and a program for printing, on a single same sheet of paper, a standard color image obtained from the standard image processing and at least one processed image obtained from the image processing under different processing conditions.

The number of the processed image obtained from the image processing carried out under different processing conditions need not necessarily be one. A plurality of processed images, which have been obtained by carrying out the image processings under different processing conditions, should preferably be printed together with the standard color image. In such cases, the results of various kinds of image processings can be seen simultaneously.

Photographs, which are obtained by carrying out the image processing under the processing conditions different from those for the standard color image, need not necessarily be printed on a single same sheet of paper. If the photographs are located side by side and can be seen simultaneously, the original purposes can be accomplished. Therefore, for example, the photographs may be printed on paper having been cut into different pieces.

The present invention also includes the cases wherein the images obtained from different image processings are displayed on a display screen of a display device. Specifically, a standard color image and at least one processed image may be displayed on a display screen of a single display device, the standard color image being obtained by carrying out standard image processing on a single original color image, the processed image being obtained by carrying out image processing under different processing conditions on the original color image.

With the method of forming photographic images in accordance with the present invention, a standard color image, which is obtained by carrying out standard image processing on a single original color image, and at least one processed image (at least one non-standard color image), which is obtained by carrying out image processing under different processing conditions on the original color image, is printed on a single sheet of photosensitive material or displayed on a display screen of a single display device, such as a cathode ray tube (CRT) display device. Therefore, the prints, which represent the images obtained by altering various kinds of processing conditions, can be seen simultaneously on a single sheet of photosensitive material. Also, the displayed images, which represent the images obtained by altering various kinds of processing conditions, can be seen simultaneously on a single display device. Accordingly, various variations of processed images obtained from the image processings, which are carried out by setting the processing conditions to various different processing conditions, can be experienced easily.

For example, by the side of a standard color photograph of an original image, a black-and-white photograph or a sepia-tone photograph of the same original image can be seen. Also, a photograph, in which a pattern of a person at a center region has been emphasized by rendering the pattern of the person clear and blurring the surrounding regions, can be seen by the side of a standard color photograph. Therefore, the photographer can enjoy various new variations of photographs such as that he can select to take additional prints in a sepia tone or to take one additional center focus print.

In practice, the variations of prints can be directly set in an album, and an interesting collection of photographs can be formed.

In cases where the images obtained from different image processings are displayed on a display screen of a display device, for admiration, for reference in specifying an order of printing, or the like, a standard color image and various non-standard color images may be displayed side by side as in an index print. Alternatively, pairs of a standard color image and non-standard color images may be changed over at predetermined time intervals and displayed successively as in frame feed displaying. As another alternative, the images may be changed over and displayed successively as in a motion picture.

The recording medium in accordance with the present invention may take on the form of a medium which records the novel software functions for the entire system. Alternatively, the recording medium in accordance with the present invention may take on the form of a medium which records an improved version of conventional software functions installed in a control device for operating a digital printer.

BRIEF DESCRIPTION OF THE DRAWINGS

FIG. 3 is a schematic plan view showing a scanning optical unit of the printer, which constitutes a portion of the photographic image forming apparatus shown in FIG. 1.

DESCRIPTION OF THE PREFERRED EMBODIMENTS

The present invention will hereinbelow be described in further detail with reference to the accompanying drawings.

Figure 1:
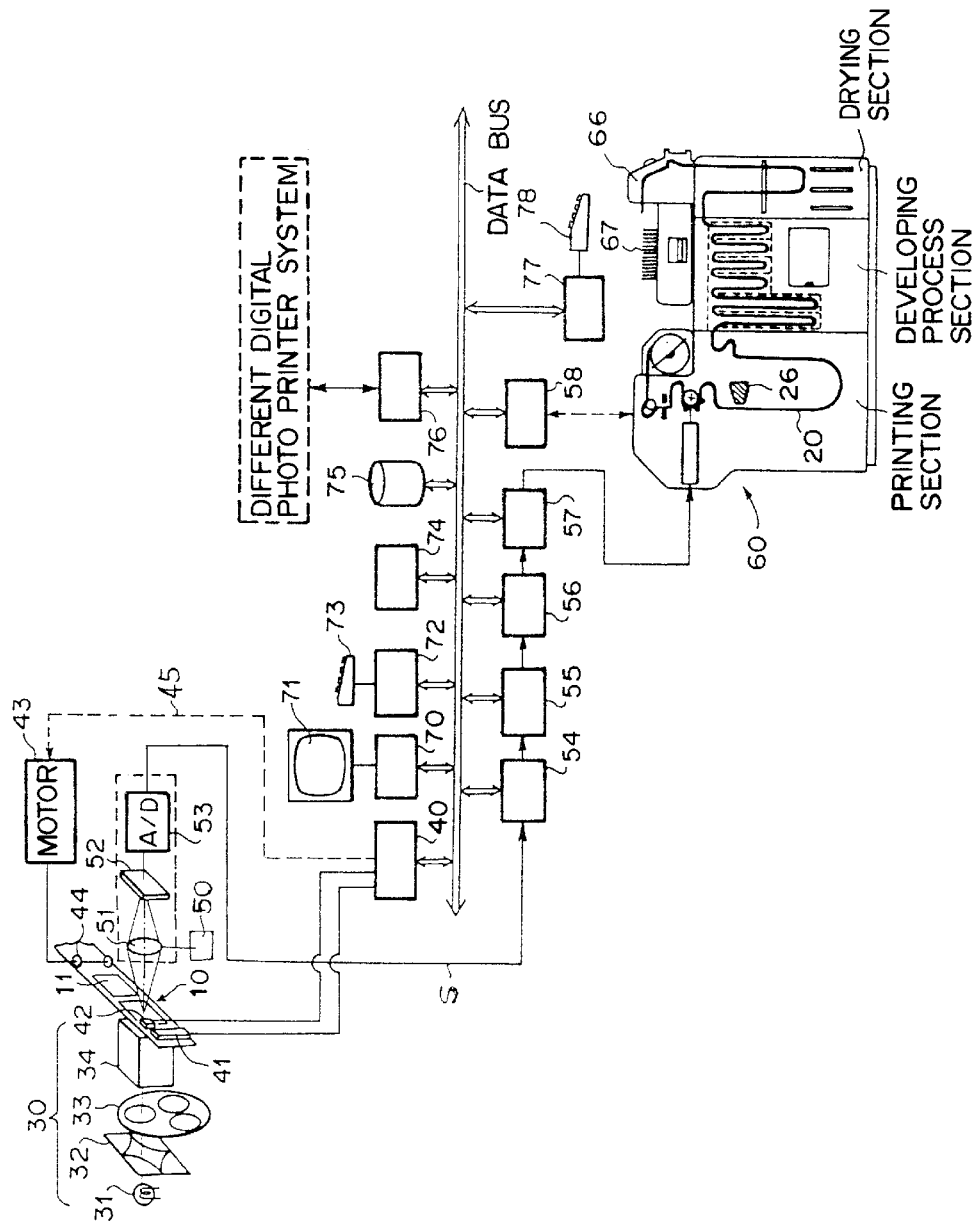
FIG. 1 is a schematic view showing an embodiment of the photographic image forming apparatus for carrying out the photographic image forming method in accordance with the present invention.

FIG. 1 shows a digital photo printer, which is an embodiment of the photographic image forming apparatus for carrying out the photographic image forming method in accordance with the present invention.

The digital photo printer shown in FIG. 1 comprises a bar code reader 42 for reading a bar code of photographic film 10, and an image plane detecting sensor 41 for detecting a region of each of frames 11, 11, . . . from the photographic film 10 in accordance with a change in image density. The digital photo printer also comprises a sprocket 44, which engages with perforations of the film 10 and conveys the film 10, and a motor 43 for driving the sprocket 44. The digital photo printer further comprises a film scanner control interface (I/F) 40 for feeding the information, which represents a frame number having been read by the bar code reader 42, and the information, which represents the region of each frame 11 having been detected by the image plane detecting sensor 41, to a data bus and feeding a signal 45, which controls the motor 43, to the motor 43.

The digital photo printer still further comprises a light source unit 30. The light source unit 30 is provided with a light source 31 for producing light and irradiating it to each frame 11 of the film 10, a light regulating unit 32, a color separation unit 33, and a diffusing box 34. The digital photo printer also comprises a CCD image sensor 52 for photo-electrically reading out a transmission image of an image recorded on the frame 11, to which the light is irradiated by the light source unit 30, via an image forming optical system 51. The digital photo printer further comprises an AF motor 50 for adjusting the focal length of the image forming optical system 51, and an analog-to-digital converter 53 for converting image signals, which represent the transmission image described above and have been obtained from the photoelectric conversion carried out by the CCD image sensor 52, into digital image signals S. The digital photo printer still further comprises a first image processing unit 54 for carrying out compensation for adverse effects of shading and dark current on the digital image signals S, which have been received from the analog-to-digital converter 53, and feeding processed image signals S having good quality into a frame memory 55. The digital photo printer also comprises a second image processing unit 56 for carrying out predetermined image processing on the processed digital image signals S, which are received from the frame memory 55. The digital photo printer further comprises a modulator driver 57 for feeding out modulation signals in accordance with the digital image signals S, which have been obtained from the image processing carried out by the second image processing unit 56 by altering image processing parameters.

The digital photo printer still further comprises a printer 60 for reproducing a visible image from the signals having been modulated by the modulator driver 57, and a printer control I/F 58. The digital photo printer also comprises a hard disk drive unit 75 for receiving the digital image signals S from the frame memory 55 via a data bus and storing them on a hard disk, a CRT monitor 71 for reproducing a visible image from the digital image signals S, when necessary, or displaying image processing conditions, or the like, and a display I/F 70. The digital photo printer further comprises a keyboard 73 from which the image processing conditions, corrected values for the image processing conditions, image retrieval information, and the like, are specified, a keyboard I/F 72, and a central processing unit (CPU) 74. The CPU 74 controls the hard disk drive unit 75 to store the image retrieval information, which represents the frame number having been read by the bar code reader 42, the corresponding information, which represents the image processing conditions received from the first image processing unit 54 and the second image processing unit 56, and the corresponding digital image signals S, which are received from the frame memory 55, via the data bus. The CPU 74 also controls the operation for retrieving the digital image signals S, which represent the image corresponding to the image retrieval information specified from the keyboard 73, from the hard disk of the hard disk drive unit 75. The CPU 74 further controls the other devices connected to the data bus. The digital photo printer still further comprises a communication port 76 for communicating with a different digital photo printer system via a communication line, a keyboard 78 which is located at an inspection site for inspecting photographic prints having been reproduced by the printer 60 and from which a make-over command is given, when necessary, and a keyboard I/F 77.

Specifically, the film 10 is supported by a carrier. As the auto carrier for processing the negative film, an auto carrier used in a conventional miniature development laboratory, such as NC135S supplied by Fuji Photo Film Co., Ltd., may be employed. With the auto carrier, images in ranges corresponding to print forms, such as a full size, a panorama size, and a powerful size, can be read out. Also, in cases where a trimming carrier used in the conventional miniature development laboratory is employed, the image size can be enlarged by a factor of approximately 1.4 with the center being taken as an axis. As a reversal carrier, those proposed in, for example, Japanese Unexamined Patent Publication Nos. 9(1997)-114011, 9(1997)-114016, 9(1997)-114017, 9(1997)-120104, and 9(1997)-130557.

In the image processing means described above, processing, such as gradation correction, color transform, and image density transform, can be carried out. Also, processing for restricting the film graininess and enhancing the sharpness as proposed in, for example, U.S. Ser. No. 08/598,918 can be carried out. Further, automatic shutting light processing as proposed in, for example, U.S. Ser. No. 08/672,939 with which a reproduced image having good image quality is obtained from an image having a high luminous contrast, can be carried out.

The hard disk drive unit 75 has a storage capacity of at least 25 GB (giga bytes). Ordinarily, the amount of the image signals required to obtain resolution, which corresponds to a photographic print having an L size (approximately 9 cm×13 cm), is calculated to be approximately 5 MB per image. In cases where the image signal is compressed such that the image quality may not become bad, the amount of the compressed image signal becomes equal to approximately 1MB per image. As for an average miniature development laboratory, it can be set that the number of workdays is 25 days per month, the number of rolls of film to be processed is 50 rolls per day, and the number of frames per roll of film is 20 frames. In cases where old image signals corresponding to rolls of film, for which at least one month has elapsed after their processing, are erased successively, the storage capacity required for the hard disk drive unit 75 is approximately 25 GB.

The printer 60 is composed of a printing section, a developing process section, and a drying section. The printing section comprises a magazine for storing a roll of photosensitive material 20. As the magazine, a magazine used in an ordinary miniature development laboratory, e.g. a magazine described in Japanese Unexamined Patent Publication No. 6(1994)-161050, may be employed. The drying section is provided with a cutter 66 for cutting the exposed and dried portions (photographic prints) one after another from the photographic paper, when necessary. The drying section is also provided with a sorter 67 for arraying the cut photographic prints. As the sorter 67, a sorter disclosed in Japanese Unexamined Patent Publication No. 4(1992)-199052 may be employed. As the processing section composed of the developing process section and the drying section, a conventional miniature development laboratory type, 10ME(2), may be employed. The processing section is described in detail in, for example, "Laboratory Equipment 25-Year History," published by Fuji Photo Film Co., Ltd., February 1994; and a service manual, an instruction manual "Basic Operation Edition," an instruction manual "Supervisor Edition," an instruction manual "Applied Operation Edition," "Installation Guidance," and "Parts List" for "Mini-Labo Champion Printer Processor SUPER FA-257 PP1257VR PP1257V SUPER FA-277 PP1827VR PP1827V," published by Fuji Photo Film Co., Ltd., September 1995. The above-enumerated documents are stored at the data library of the Japanese Patent Office. The printing section will be described later in detail.

How this embodiment operates will be described hereinbelow.

Firstly, the motor 43 is driven by the film scanner control I/F 40, and the sprocket 44 connected to the motor 43 is rotated. The left end of the film piece 10, i.e. the negative film composed of the frames 11, 11, . . . , on which the images have been recorded, is inserted to the sprocket 44, and the film piece 10 is thereby conveyed by the sprocket 44.

While the sprocket 44 is conveying the film piece 10, the image plane detecting sensor 41 detects the image density on the film piece 10 in order to find the region, at which each frame 11 is located. In accordance with the thus detected image density information, the film scanner control I/F 40 controls the operation of the motor 43 under the control by the CPU 74, such that the first frame 11 with respect to the conveyance direction may stop at a predetermined read-out position.

When the image plane detecting sensor 41 detects the first frame 11 and the first frame 11 is stopped at the predetermined read-out position by being controlled by the CPU 74, the light is produced by the light source unit 30 and irradiated to the frame 11. The light, which has passed through the frame 11 and carries the image information having been recorded on the frame 11, impinges upon the image forming optical system 51. The light carrying the image information then passes through the image forming optical system 51 and forms a predetermined image on an image receiving surface of the CCD image sensor 52. The CCD image sensor 52 photoelectrically converts the image into a predetermined image signal. The thus obtained image signal is converted by the analog-to-digital converter 53 into a digital image signal. The digital image signal is fed into the first image processing unit 54, in which the adverse effects of shading and dark current are eliminated from the digital image signal. The digital image signal, which has been obtained from the first image processing unit 54, is temporarily stored on the frame memory 55.

The image signal is then fed from the frame memory 55 into the second image processing unit 56. In the second image processing unit 56, predetermined image processings are carried out on the image signal.

Specifically, desired image processings among various kinds of image processings described above are carried out on the digital image signal automatically in accordance with the programs, which have been set previously, or manually with the keyboard 73. The image signal, which has been obtained from the image processings, is fed into the printing section of the printer 60 and processed in the manner described below.

Figure 2:
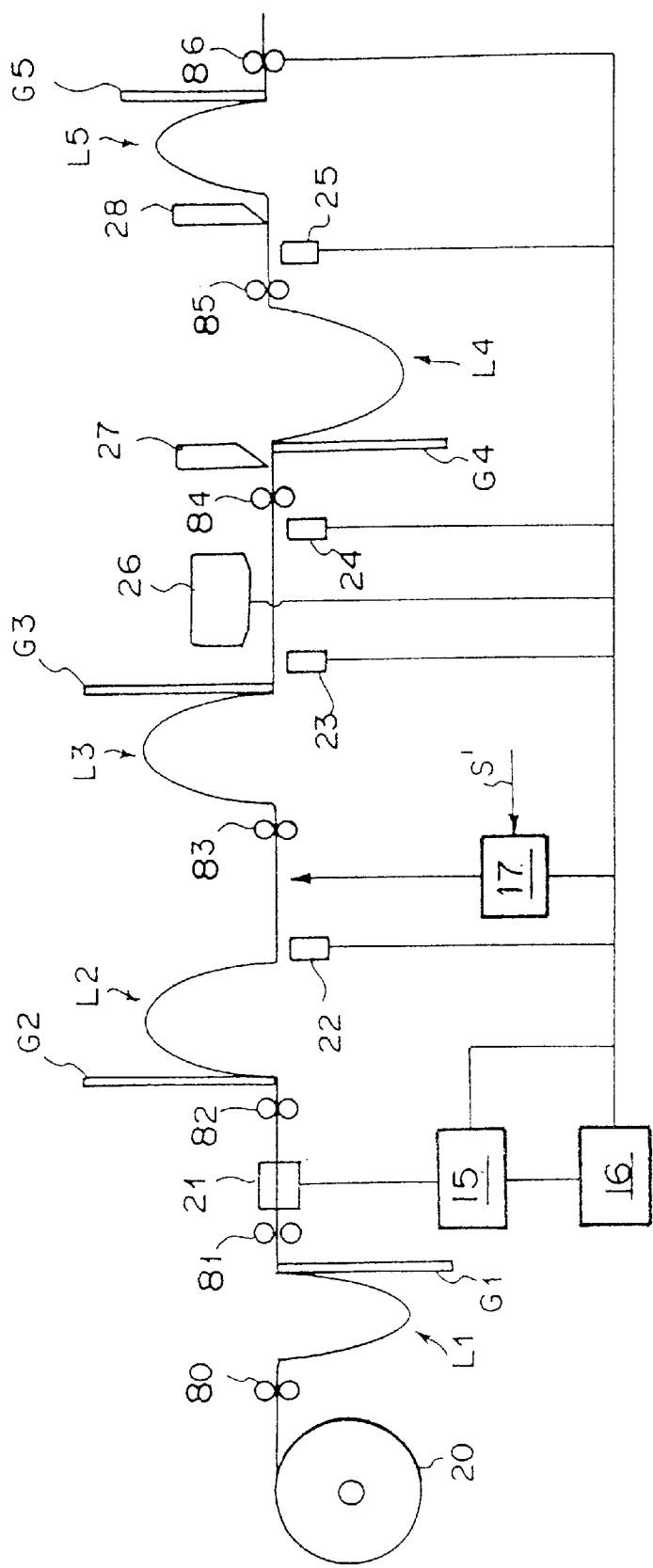
FIG. 2 is a schematic view showing a printing section of a printer, which constitutes a portion of the photographic image forming apparatus shown in FIG. 1.

FIG. 2 shows the printing section in detail. As illustrated in FIG. 2, the printing section comprises pairs of conveying rollers 80, 81, 82, 83, 84, 85, and 86 for conveying the photosensitive material 20 unwound from its roll. The printing section also comprises a hole punch unit 21 for making holes, which indicate the partition of a region of one frame of the image to be reproduced (in cases where a plurality of images are to be reproduced on a single sheet, the size containing the plurality of the images is taken as one frame), through the photosensitive material 20. The printing section further comprises an image reproducing section 17 for reproducing an image, which is represented by image signals S', as a latent image on the photosensitive material 20, and a back print section 26 for carrying out back printing on the photosensitive material 20, when necessary. The printing section still further comprises a first cutter 27 and a second cutter 28 for cutting the photosensitive material 20 into frame photosensitive materials having a necessary size, and sensors 22, 23, 24, and 25 for detecting the holes having been made through the photosensitive material 20. The printing section also comprises a print control information storing section 15. When a hole has been made through the photosensitive material 20 by the hole punch unit 21, the print control information storing section 15 stores the print control information with respect to the frame, which corresponds to the hole. The print control information represents the print size of the frame, whether a margin is or is not to be formed, the waiting time between the exposure and the development, and the like. The printing section further comprises a control section 16 for controlling the operation of the image reproducing means.

A first loop L1 is formed on the side upstream from the hole punch unit 21. A second loop L2 is formed on the side upstream from the image reproducing section 17. A third loop L3 is formed on the side upstream from the back print section 26. A fourth loop L4 is formed on the side upstream from the second cutter 28. Also, a fifth loop L5 is formed on the side upstream from a development means. Guide plates G1, G2, G3, G4, and G5 are formed at positions respectively corresponding to the loops L1, L2, L3, L4, and L5.

How the printing section shown in FIG. 2 operates will be described hereinbelow. The photosensitive material 20 is delivered from its roll by the pairs of conveying rollers 80 and 81. For the adjustment of the feed rate, the delivered photosensitive material 20 is allowed to wait at the first loop L1. Thereafter, holes are made through the photosensitive material 20 at intervals corresponding to the printing frames by the hole punch unit 21. When the holes have been made, the print control information with respect to the frame corresponding to the portion between the hole, which has now been made, and the hole, which has been made previously on the side downstream from the hole having now been made, is stored in the print control information storing section 15.

The print control information is stored with respect to each frame image, which corresponds to the portion located between the two adjacent holes having been made through the photosensitive material 20. The print control information represents a plurality of pieces of information with respect to each frame, such as the print size of each frame, whether each frame contains a plurality of images or a single image, whether a margin is or is not to be formed, the waiting time between the exposure and the development.

Thereafter, the photosensitive material 20, through which the holes have been made, is conveyed by the pair of conveying rollers 82 into the image reproducing section 17. At this time, for the adjustment of the feed rate, the photosensitive material 20 is allowed to wait at the second loop L2. In the image reproducing section 17, the order of the frame, on which an image is to be reproduced, is detected by the sensor 22. The print control information in accordance with the detected order of the frame is read by the control section 16 from the print control information storing section 15. The print control information having thus been read is fed into the image reproducing section 17. In the image reproducing section 17, in accordance with the received print control information, the image, which is represented by the image signals S' having been obtained from various kinds of image processings, is reproduced as a latent image on the photosensitive material 20 by the exposure thereof to light beams. Specifically, the light beams are modulated in accordance with the image information, which is represented by the image signals S', and the photosensitive material 20 is scanned with and exposed to the modulated light beams in two-dimensional directions. In this manner, the image having a size corresponding to the print control information is reproduced. In cases where the print control information represents that a margin is to be formed, the image is reproduced such that a margin may be formed in the frame.

The photosensitive material 20, which has been exposed to the light beams, is conveyed by the pair of conveying rollers 83 into the back print section 26. At this time, for the adjustment of the feed rate, the photosensitive material 20 is allowed to wait at the third loop L3. In the back print section 26, the order of the frame, on which a back print is to be carried out, is detected by the sensor 23. The print control information in accordance with the detected order of the frame is read by the control section 16 from the print control information storing section 15. The print control information having thus been read is fed into the back print section 26. In the back print section 26, in accordance with the received print control information, the back print is carried out on the frame.

The photosensitive material 20, on which the back print has been carried out, is conveyed by the pair of conveying rollers 84 to the position, at which the first cutter 27 is located. When all of the printing operations on the photosensitive material 20 have been finished, the first cutter 27 cuts the photosensitive material 20 at the position of a hole, which is detected by the sensor 24. Therefore, while the image reproducing operations are being carried out, the first cutter 27 is not used. The photosensitive material 20 is conveyed even further by the pair of conveying rollers 85 to the position, at which the second cutter 28 is located. At this time, in accordance with the order of the frame photosensitive material having been detected by the sensor 25, the control section 16 reads the print control information, which corresponds to the frame photosensitive material having been detected by the sensor 25, from the print control information storing section 15. Also, the control section 16 refers to the information, which concerns the time between the finish of the exposure to the start of the development and is contained in the read print control information. In accordance with the information concerning the time, in cases where the time has not elapsed from the finish of the exposure, the control section 16 ceases the operation of the pair of conveying rollers 85, and allows the photosensitive material 20 to wait at the fourth loop L4. In accordance with the position of the hole detected by the sensor 25, the second cutter 28 cuts the photosensitive material 20 into a size corresponding to several frames to several tens of frames, for which the aforesaid time has elapsed. Also, at this time, for the adjustment of the feed rate, the photosensitive material 20 is allowed to wait at the fourth loop L4.

The control section 16 refers to the information, which concerns the time between the finish of the exposure to the start of the development and is contained in the print control information. After the time has elapsed, the control section 16 operates the pair of conveying rollers 86 and conveys the portion of the photosensitive material 20, which has been cut by the second cutter 28, into the developing process section shown in FIG. 1. As the conveyance means, the means proposed in Japanese Unexamined Patent Publication No. 4(1992)-147259 may be employed. As a processing tank, the tank proposed in Japanese Unexamined Patent Publication No. 4(1992)-155333 may be employed.

In the developing process section, a developing process is carried out on the frame photo sensitive material, and the images represented by the image signals are reproduced as visible images on the photosensitive material. After the exposure has been finished for all of frame photosensitive materials, the photosensitive material 20 is cut by the first cutter 27. In this manner, the reproduction of images on the photosensitive material is finished.

With the apparatus for forming photographic images in accordance with the present invention, the frame containing an image, which is obtained by carrying out standard image processing, and at least one processed image, which is obtained by carrying out image processing under different processing conditions, is printed on a single sheet of photosensitive material 20. Therefore, the images, which are obtained by altering the processing conditions, can be seen simultaneously on a single frame of photosensitive material 20.

A scanning optical system, which may be employed in the printer 60, will hereinbelow be described in detail.

Figure 4:
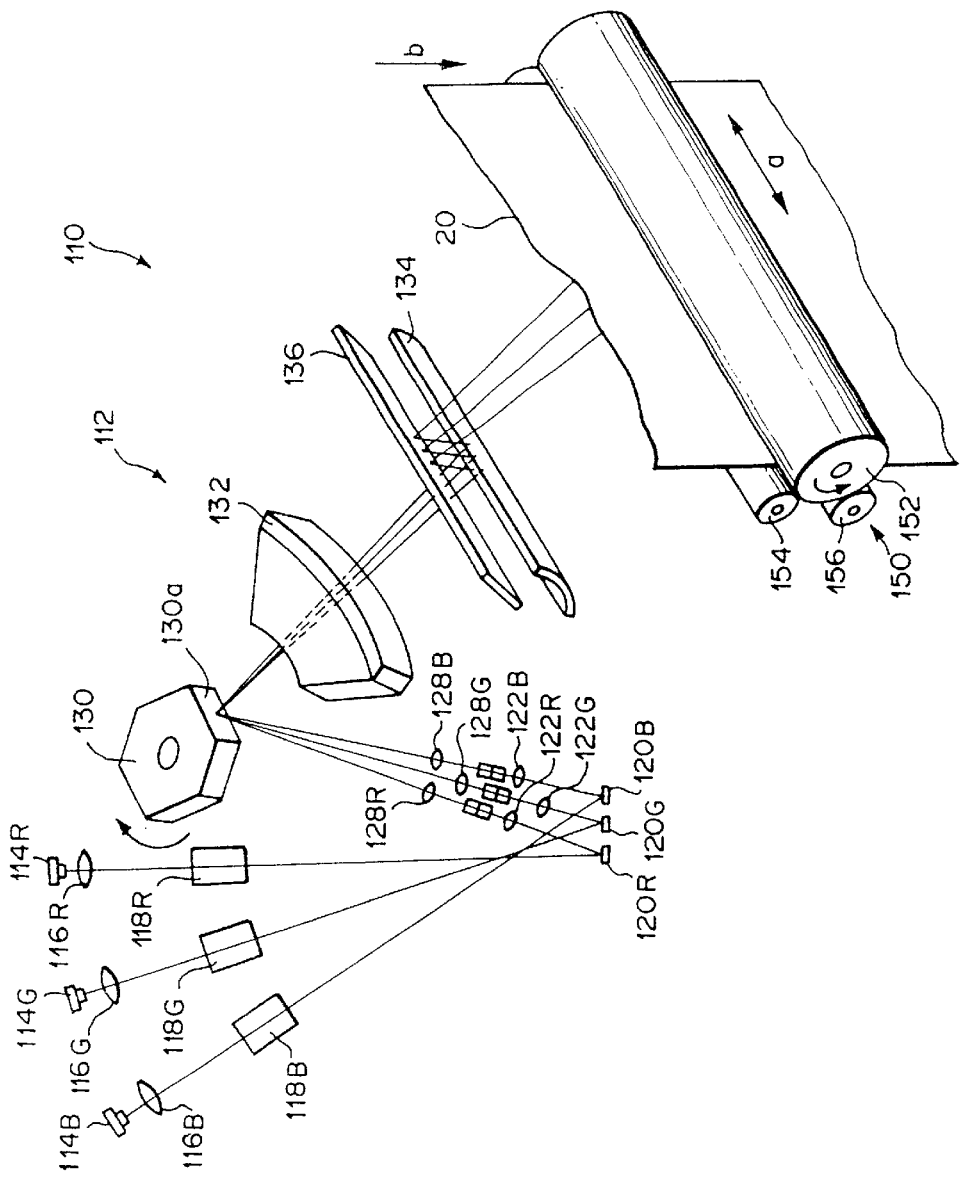
FIG. 4 is a schematic perspective view showing the scanning optical unit shown in FIG. 3.

FIG. 3 is a schematic plan view showing a scanning optical unit by removing an upper portion of a closed case housing. FIG. 4 is a schematic perspective view showing a scanning exposing optical system and a sub-scanning conveyance means of the scanning optical unit shown in FIG. 3.

With reference to FIGS. 3 and 4, a scanning optical unit 110 comprises a main scanning section 112, which is provided with a plurality of optical devices constituting the scanning exposing optical system, and a closed case housing 140, which accommodates certain optical devices among the plurality of the optical devices of the main scanning section 112, such that they may be blocked from the external atmosphere. The scanning optical unit 110 also comprises a sub-scanning section 150, which constitutes the sub-scanning conveyance means. The sub-scanning conveyance means supports the long strip of the photosensitive material 20, which is scanned with light beams in a main scanning direction (indicated by the double headed arrow "a" in FIG. 4) by the main scanning section 112, at a predetermined position for exposure. In this state, the sub-scanning conveyance means conveys the long strip of the photosensitive material 20 in a sub-scanning direction, which is approximately normal to the main scanning direction. (In FIG. 4, the sub-scanning direction is indicated by the arrow "b.") In the main scanning section 112, the light beams of three primary colors are modulated in accordance with the image to be reproduced (in accordance with the image density obtained by exposure), and the modulated light beams are deflected and scanned in the main scanning direction, which is indicated by the double headed arrow "a" in FIG. 4. Also, in the sub-scanning section 150, while the long strip of the photosensitive material 20 is being supported at the predetermined position for exposure, the photosensitive material 20 is conveyed in the sub-scanning direction, which is approximately normal to the main scanning direction and is indicated by the arrow "b" in FIG. 4. In this manner, the photosensitive material 20 is scanned with the three light beams in two-dimensional directions, and a latent image is thereby reproduced on the photosensitive material 20.

The main scanning section 112 constitutes a three-laser-beam different-angle incidence optical system (a three-light-source non-combining optical system) for scanning the photosensitive material 20, whose spectral sensitivity has dependency upon wavelengths, particularly a normal color photosensitive material in which the peaks of spectral sensitivities with respect to light beams of the three primary colors are located in the visible light region, with laser beams of the three primary colors. The main scanning section 112 comprises a semiconductor laser (LD) 114R, which produces a laser beam 115R for red (R) exposure, a wavelength conversion laser (G-SHG) 114G, which utilizes a second harmonic generation (SHG) device and produces a laser beam 115G for green (G) exposure, and a wavelength conversion laser (B-SHG) 114B, which utilizes an SHG device and produces a laser beam 115B for blue (B) exposure. The main scanning section 112 also comprises a collimator lens 116R, an acousto-optic modulator (AOM) 118R, a reflecting mirror 120R, a converging lens 122R, a slit 124R, an ND filter 126R, and a cylindrical lens 128R, which are located along the direction of travel of the laser beam 115R having been produced by the laser beam source 114R. The main scanning section 112 further comprises a collimator lens 116G, an AOM 118G, a reflecting mirror 120G, a converging lens 122G, a slit 124G, an ND filter 126G, and a cylindrical lens 128G, which are located along the direction of travel of the laser beam 115G having been produced by the laser beam source 114G. The main scanning section 112 still further comprises a collimator lens 116B, an AOM 118B, a reflecting mirror 120B, a converging lens 122B, a slit 124B, an ND filter 126B, and a cylindrical lens 128B, which are located along the direction of travel of the laser beam 115B having been produced by the laser beam source 114B. The main scanning section 112 also comprises a rotating polygon mirror 130, an fθ lens 132, a cylindrical mirror 134, and a reflecting mirror 136. The laser beams 115R, 115G, and 115B of the three primary colors are reflected by the reflecting mirror 136 and impinge upon the photosensitive material 20, which is conveyed by the sub-scanning conveyance means of the sub-scanning section 150. The laser beams 115R, 115G, and 115B thereby define a main scanning line SL.

As the light sources for producing light having wavelengths falling within predetermined narrow wavelength ranges, the three-light-source non-combining optical system illustrated in FIGS. 3 and 4 is provided with the three laser beam sources 114R, 114G, and 114B, which produce the laser beams such that they may impinge at slightly different angles (e.g. at angles varying by approximately 4°) upon a reflecting surface 130a of the rotating polygon mirror 130. The LD 114R for red exposure produces the laser beam 115R having a wavelength of 680 nm. The G-SHG 114G for green exposure produces the laser beam 115G having a wavelength of 532 nm. The B-SHG 114B for blue exposure produces the laser beam 115B having a wavelength of 473 nm. The exposing optical system employed in the scanning optical unit is not limited to the three-light-source non-combining optical system, such as the three-laser-beam different-angle incidence optical system. The exposing optical system may be selected various system, with which the photosensitive material can be scanned with and exposed to light beams of the three primary colors. For example, the exposing optical system may be designed such that three light beams having been produced by three light sources may be combined by using a dichroic mirror, and the combined light beams may impinge upon a rotating polygon mirror. Also, no limitation is imposed upon the light sources, and the light sources may be selected from various combinations of light sources producing light beams, such that the photosensitive material, whose spectral sensitivity has dependency upon wavelengths, can be exposed. For example, semiconductor lasers, such as laser diodes (LD's), or gas lasers, such as He-Ne lasers, may be employed. Light sources, which produce light beams having wavelengths falling within predetermined narrow wavelength ranges, particularly in the visible light wavelength region, may be selected appropriately in accordance with the spectral sensitivity characteristics.

The collimator lenses 116R, 116G, and 116B respectively collimate the laser beams 115R, 115G, and 115B having been respectively produced by the laser beam sources 114R, 114G, and 114B and forms beam waists on the AOM's 118R, 118G, and 118B. The AOM's 118R, 118G, and 118B respectively modulate the laser beams 115R, 115G, and 115B in accordance with three-color image signals, which have been obtained from image processings carried out by an image processing unit (not shown). No limitation is imposed upon how each light beam is modulated, and one of various modulation techniques may be employed. For example, various other kinds of light modulators may be employed in lieu of the illustrated AOM's. Alternatively, a laser beam source may be modulated directly. The direct modulation may be the intensity modulation, the pulse number modulation, or the pulse width modulation.

The reflecting mirrors 120R, 120G, and 120B respectively change the directions of the optical paths of the laser beams 115R, 115G, and 115B, such that the laser beams 115R, 115G, and 115B may impinge upon positions on a single line, which are close to one another, or upon a single same position on the single line on the reflecting surface 130a of the rotating polygon mirror 130. The converging lenses 122R, 122G, and 122B serve to adjust the beam diameters with respect to the main scanning direction. The cylindrical lenses 128R, 128G, and 128B serve to adjust the beam diameters with respect to the sub-scanning direction. Also, the cylindrical lenses 128R, 128G, 128B, the fθ lens 132, and the cylindrical mirror 134 constitute a surface inclination compensating optical system and compensate for adverse effects of inclination of the reflecting surface 130a of the rotating polygon mirror 130. The slits 124R, 124G, and 124B adjust the beam diameters. The ND filters 126R, 126G, and 126B adjust the intensity of light.

The rotating polygon mirror 130 deflects the laser beams 115R, 115G, and 115B, which have been modulated in accordance with the three-color image signals, in one-dimensional direction, i.e. in the main scanning direction, defines the main scanning line SL on the photosensitive material 20, and thereby carries out image-wise exposure. The laser beam sources 114R, 114G, and 114B are located such that the laser beams 115R, 115G, and 115B produced by them may impinge at slightly different angles upon a single reflecting surface 130a of the rotating polygon mirror 130, may be reflected by the reflecting surface 130a, may ultimately form images at different angles on the same scanning line SL, which is formed on the photosensitive material 20, and may thereby scan along the same scanning line at certain time intervals. Also, as illustrated in FIG. 3, in the closed case housing 140, which will be described later in detail, the rotating polygon mirror 130 rotates in the direction, which is indicated by the arrow in FIG. 4, in order to deflect the laser beams 115R, 115G, and 115B in the main scanning direction. It often occurs that non-uniformity in a wind, which is generated by the rotation of the rotating polygon mirror 130, dust, or the like, which floats due to the wind, or the dust, or the like, which thus floats and clings to the optical devices located in the closed case housing 140, adversely affects the laser beams 115R, 115G, and 115B. As a result, it often occurs that the exposure of the photosensitive material 20 to the laser beams 115R, 115G, and 115B and the quality of the reproduced image are affected adversely. In such case, ordinarily, the rotating polygon mirror 130 may be covered with a transparent cover 131, e.g. a transparent glass cover, which does not obstruct the rotation of the rotating polygon mirror 130.

The fθ lens 132 acts such that the laser beams 115R, 115G, and 115B may accurately form the images at every position on the main scanning line. The fθ lens 132 is compensated such that the chromatic aberrations with respect to light having wavelengths of 473 nm, 532 nm, and 680 nm may fall within allowable ranges. The cylindrical mirror 134 constitutes the surface inclination compensating optical system together with the fθ lens 132 and the cylindrical lenses 128R, 128G, 128B. Also, the cylindrical mirror 134 changes the directions of the optical paths of the laser beams 115R, 115G, and 115B and causes them to impinge upon the reflecting mirror 136. The reflecting mirror 136 changes the directions of the optical paths of the laser beams 115R, 115G, and 115B and causes them to travel toward the main scanning line SL, which is approximately normal to the sub-scanning direction on the photosensitive material 20 that is conveyed for the sub-scanning by the sub-scanning section 150.

A start-of-scan (SOS) sensor 138, which detects the start of the image-wise exposure along one line, is located in the vicinity of the cylindrical lens 128R. Also, an SOS reflecting mirror 139 is located on the inner surface of the closed case housing 140 at a position in the vicinity of an exit window 144, which will be described later. The SOS reflecting mirror 139 reflects at least one of the three laser beams 115R, 115G, and 115B, which have passed through the fθ lens 132, at its scanning start point toward the SOS sensor 138.

In the scanning optical unit 110, certain optical devices among the plurality of the optical devices constituting the three-light-source non-combining optical system of the main scanning section 112 are accommodated in the closed case housing 140. Specifically, the reflecting mirrors 120R, 120G, 120B, the converging lenses 122R, 122G, 122B, the slits 124R, 124G, 124B, the ND filters 126R, 126G, 126B, the cylindrical lenses 128R, 128G, 128B, the rotating polygon mirror 130, the fθ lens 132, the cylindrical mirror 134, and the reflecting mirror 136 are accommodated in the closed case housing 140. These optical devices are located at predetermined positions and secured to a bottom surface, which serves as a base plate, of the closed case housing 140. The closed case housing 140 has a predetermined volume and a predetermined shape. A portion of the closed case housing 140, e.g. its portion corresponding to a cover, may be formed releasably. The laser beam sources 114R, 114G, 114B, the collimator lenses 116R, 116G, 116B, and the AOM's 118R, 118G, 118B are located on the side outward from the closed case housing 140.

Entry windows 142R, 142G, and 142B are formed at side wall portions of the closed case housing 140, through which the laser beams 115R, 115G, and 115B having been modulated by the AOM's 118R, 118G, and 118B of the main scanning section 112 on the side outward from the closed case housing 140 and traveling toward the reflecting mirrors 120R, 120G, and 120B in the closed case housing 140 enter into the closed case housing 140. The exit window 144 is formed at a side wall portion of the closed case housing 140, through which the laser beams 115R, 115G, and 115B having been reflected by the reflecting mirror 136 in the closed case housing 140 and traveling toward the sub-scanning section 150 on the side outward from the closed case housing 140 are radiated out from the closed case housing 140. The closed case housing 140 is formed such that the region inward from the closed case housing 140 may be blocked from the external atmosphere and adverse effects of external light, dust, or the like, may be eliminated. The closed case housing 140 may be produced by using a material having light-shielding properties, e.g. a material for known optical recording apparatuses, such as a metal (aluminium, or the like) or a synthetic resin, and with a known techniques, such as forging, pressing, or injection molding. The optical devices constituting the exposing optical system may be located at predetermined positions on the bottom surface, which serves as the base plate, of the closed case housing 140 and secured to the bottom surface on the sides inward and outward from the closed case housing 140 by using known means, such as grooves, protrusions, pins, or leaf springs. Alternatively, the optical devices may be supported by or secured to optical device mounting members, and the optical device mounting members may be located at predetermined positions by using various kinds of position adjusting means and may be secured with fixing means, such as screws. In this manner, the optical devices may be located at the predetermined positions and secured.

As illustrated in FIG. 4, the sub-scanning section 150 is provided with an exposure drum 152, which can rotate forwardly and reversely, and driven nip rollers 54 and 56. The driven nip rollers 154 and 156 are located with the main scanning line SL, which is defined at the position for exposure on the photosensitive material 20 located on the exposure drum 152, intervening therebetween and push the photosensitive material 20 against the exposure drum 152. When the scanning and exposing operation is to be carried out for at least one image, the exposure drum 152 is rotated forwardly (i.e., in the direction indicated by the arrow in FIG. 4), and the long strip of the photosensitive material 20 is conveyed forwardly in the sub-scanning direction (indicated by the arrow "b" in FIG. 4), which is approximately normal to the main scanning line (indicated by the double headed arrow "a" in FIG. 4), while the photosensitive material 20 is being supported at the position for exposure by being sandwiched between the exposure drum 152 and the nip rollers 154, 156. In this manner, the photosensitive material 20 is scanned with and exposed to the laser beams. Such that the photosensitive material 20 may be utilized efficiently, the distance between adjacent frames should preferably be as short as possible and set to be, for example, approximately 3 mm or, if possible, approximately 2 mm. However, if the distance between adjacent frames is set to be such a small value, after the exposing operation and the conveyance are stopped and the conveyance is begun again, it will be difficult to obtain uniform and stable conveyance speed for the next frame. Accordingly, in such cases, immediately after the scanning exposing operation has been carried out for a single image or has been carried out successively for a plurality of images, the exposure drum 152 is rotated reversely, and the photosensitive material 20 is conveyed in the direction reverse to the sub-scanning direction and by a predetermined distance and is stopped. Specifically, the photosensitive material 20 is returned until a predetermined position in the exposed image region on the photosensitive material 20 comes to the position of the exposure drum 152. The photosensitive material 20 is then stopped and allowed to wait for the next operation. Thereafter, when preparations have been made for the exposing operation for the next image or a plurality of the next images to be formed successively, the exposure drum 152 is again rotated forwardly, and the photosensitive material 20 is again conveyed in the sub-scanning direction and subjected to the scanning exposing operation. The laser beams 115R, 115G, and 115B are being produced continuously by the laser beam sources 114R, 114G, and 114B during the period in which the non-image region between adjacent frames is located at the position for exposure in cases where the scanning exposing operation is carried out successively for a plurality of images (during the period in which the photosensitive material 20 is waiting for the next exposing operation after the previous image-wise exposure has been stopped), during the period in which the conveyance and the exposing operation are in a waiting state, and during the period between when the conveyance of the photosensitive material 20 in the forward direction is begun again and when the next image region comes to the position for exposure (i.e., during the period of the waiting for the exposing operation between when the image-wise exposure is stopped and when the next exposing operation is begun).

Therefore, in the scanning optical unit 110, the portion corresponding to each of the entry windows 142R, 142G, and 142B, which are formed at the side wall of the closed case housing 140, and/or the portion corresponding to the exit window 144 is constituted of a shutter, which blocks the laser beams 115R, 115G, and 115B during the period other than the image-wise exposure and allows them to pass through the portion during the period of the image-wise exposure. Alternatively, such a shutter may be mounted on the portion corresponding to each of the entry windows 142R, 142G, and 142B and/or the portion corresponding to the exit window 144. As the shutter, a mechanical shutter proposed in, for example, Japanese Patent Application No. 7(1995)-328633 may be employed.

In the scanning optical unit 110, each of mechanical shutters 146R, 146G, and 146B comprises, for example, a disk-like shutter member, which has a cut-away portion, and a driving section for rotating the shutter member. The driving sections rotate the shutter members such that they may selectively take positions for blocking the laser beams 115R, 115G, and 115B or the positions for allowing the passage of the laser beams 115R, 115G, and 115B.

The driving sections are controlled by a control circuit, and the shutter members of the shutters 146R, 146G, and 146B are set to the open or closed state. When the scanning exposing operation is carried out on the photosensitive material 20, the shutter members are set to the open state (in which the laser beams 115R, 115G, and 115B are not blocked). Immediately after the scanning exposing operation for a single image or a series of images on the photosensitive material 20 has been finished, the shutter members are set to the closed state (in which the laser beams 115R, 115G, and 115B are blocked).

In the cases of a continuous exposing operation, during the exposure waiting period, in which the portion of the continuously conveyed photosensitive material 20 between the image region having been exposed and the next image region to be exposed is located at the position for exposure (i.e., the position upon which the laser beams impinge), the shutters 146R, 146G, and 146B are set to the closed state, and the laser beams 115R, 115G, and 115B are blocked. In this manner, the non-image region between the adjacent frames can be prevented from being exposed to the laser beams. Also, in a continuous exposing operation or in a discontinuous exposing operation, immediately after the exposing operation for a single image or a series of images has been finished, the scanning exposing operation may be ceased temporarily, and the photosensitive material 20 may be conveyed reversely a predetermined distance by the sub-scanning section 150. The photosensitive material 20 may thus be stopped with a predetermined position in the exposed image region being located at the position for exposure and is allowed to wait for the next exposing operation. In such cases, the laser beams 115R, 115G, and 115B can be blocked by the shutters 146R, 146G, and 146B during the period, in which the reverse conveyance of the photosensitive material 20 is begun and then ceased, the forward conveyance is again started, and thereafter the exposing operation for the next frame is begun. In this manner, even if the exposed image region or the non-image region between adjacent frames on the photosensitive material 20 is being located at the position for exposure (i.e., the position upon which the laser beams impinge), the exposed image region or the non-image region can be prevented from being exposed to the laser beams.

In cases where the exposing operation is to be started again, at the instant at which the non-image region between adjacent frames on the photosensitive material 20 has passed through the position for exposure and the start position of the next image region comes to the position for exposure, the shutters 146R, 146G, and 146B are set to the open state, and the laser beams 115R, 115G, and 115B are allowed to enter into the closed case housing 140. In this manner, the scanning exposing operation on the photosensitive material 20 is carried out.

Specifically, the scanning optical unit described above may be set such that the scanning width may be 210 mm, the picture element density in the main scanning direction may be 300 dpi, the picture element density in the sub-scanning direction may be 600 dpi, and the beam diameters in the main scanning direction and the sub-scanning direction may be 65 $\mu$m ($1/e^2$).

In the aforesaid embodiment of the printer, the ordinary wet photographic developing process using silver halides is employed. However, no limitation is imposed upon the type of the printer. For example, one of various known developing techniques, such as electrophotographic techniques, ink jet techniques, and thermal development printing techniques, may be employed.

As for processes for obtaining full color images with the electrophotographic techniques, various processes have heretofore been proposed, and several such methods have been put into practice. Ordinarily, in the processes for obtaining full color images with the electrophotographic techniques, a photosensitive material drum (a photoconductor), which has been electrostatically charged uniformly, is exposed image-wise to light in accordance with a color-separated image signal of a specific color, and an electrostatic latent image is thereby formed on the photosensitive material drum. Also, the latent image is developed with a color toner corresponding to the specific color, and the specific-color toner image is thereby formed on the photosensitive material drum. Such a basic electrophotographic process is repeated a necessary number of times for different colors, and a full color image is thereby formed. The processes for obtaining full color images with the electrophotographic techniques can be classified into processes, in which a full color image is obtained by using a single photosensitive material drum, and processes, in which a full color image is obtained by forming toner images of different colors on a plurality of photosensitive material drum.

In a process for obtaining a color image with an electrophotographic technique, the electrostatic charging of the photosensitive material drum, the exposure, and the development are repeated a necessary number of times for necessary colors, and the same number of color toner images as that of the necessary colors are thereby formed one upon another on a single photosensitive material drum. The color images are then transferred together with one another to a sheet of paper. Such a process is proposed in, for example, Japanese Unexamined Patent Publication No. 59(1984)-121348.

In a different process, a single photosensitive material drum is located with respect to a transfer drum, on which recording paper is supported electrostatically, and a plurality of developing devices for different colors are located with respect to the photosensitive material drum. Also, original color information is separated into colors, and an image corresponding to each color is formed on the photosensitive material drum. Each time a color toner image is formed, the color toner image is transferred to recording paper. Such operations are repeated, and the color toner images of a plurality of colors are transferred to and formed one upon another on the recording paper. Such a process is proposed in, for example, Japanese Unexamined Patent Publication No. 4(1992)-337747.

In a further different process, a plurality of photosensitive material drums are located along a belt device for conveying recording paper, and means for forming toner images of different colors are located with respect to the plurality of the photosensitive material drums. The color toner images are successively transferred from the photosensitive material drums to the conveyed recording paper, and a full color image is thereby obtained. Such a process is proposed in, for example, Japanese Unexamined Patent Publication No. 5(1993)-333662.

The processes described above contain the step of directly transferring a toner image, which has been formed on a photosensitive material drum, to a final substrate, such as paper. As an ordinary transfer technique, an electrostatic transfer technique is popular. With the electrostatic transfer technique, electrostatic force is exerted on the toner by operating a "corotoron charger", such that a polarity reverse to the polarity of charges of the toner may be given from the back surface of the final substrate, or by applying a voltage of the reverse polarity from the back surface of the final substrate, and the toner is thereby transferred to the final substrate. However, it has been known that the electrostatic transfer technique has the drawbacks described below and therefore cannot always yield a good-quality, high-gradation image.

A first drawback is that the toner transfer efficiency depends upon the toner image density and it is difficult to perfectly transfer the toner from the photosensitive material drum to the substrate. Particularly, at a high image density portion and a low image density portion, the transfer efficiency is low. Therefore, in cases where a continuous tone image is to be obtained with the electrostatic transfer technique, the problems occur in that details of a highlight portion become imperceptible and the gradation at a high image density portion is lost. Also, with the electrostatic transfer technique, since the toner on the photosensitive material drum is not transferred perfectly, the toner remains on the photosensitive material drum, and it becomes necessary to remove the residual toner from the photosensitive material drum. For such purpose, a technique for scraping the residual toner off by using a blade, or the like, is employed. However, the problems occur in that the photosensitive material drum is scratched by the scraping, streaks and non-uniformity in image density occur due to the scratches, and an image having good image quality cannot be obtained.

A second drawback is that, in cases where the toner image is transferred to the final substrate, such as paper, it is difficult to keep the electrostatic force, which is exerted on the toner, uniform by compensating for microscopic variations in electrical characteristics of the paper. As a result, the problems occur in that the toner transfer efficiency becomes non-uniform, and transfer non-uniformity occurs. Also, the problems occur in that, since the electrical characteristics of the final substrate fluctuate due to the environmental conditions, images having uniform quality cannot be obtained.

In order for the aforesaid problems to be solved, processes have been proposed, wherein a toner image having been formed on a photosensitive material is temporarily transferred to an intermediate transfer material, and thereafter the transferred toner image is again transferred to a final substrate, such as paper. For example, in Japanese Patent Publication No. 49(1974)-209 and Japanese Unexamined Patent Publication No. 62(1987)-206567, processes have been proposed, wherein a toner image is firstly transferred to a belt-like intermediate transfer material, and the unfixed toner image is secondly transferred from the intermediate transfer material to a recording medium. In the proposed processes, particularly in cases where a color image is to be formed, each time a toner image of each color has been formed on the photosensitive material, the toner image is transferred to the intermediate transfer material. In this manner, toner images of different colors are formed one upon another on the intermediate transfer material, and a full color image is thus formed thereon. The full color image is then transferred to the recording medium, such as paper. A process, in which an intermediate transfer drum is employed as the intermediate transfer material in lieu of the belt, is disclosed in, for example, Japanese Unexamined Patent Publication No. 5(1993)-341666.

In the examples described above, the toner image having been formed on the photosensitive material is transferred to the intermediate transfer material by the utilization of electrostatic force by irradiation of corona ions or application of a bias. As a different transfer technique, a technique utilizing adhesive force is disclosed in, for example, Japanese Patent Publication No. 49(1974)-38172. With the disclosed technique, an electrostatic latent image having been formed on the photosensitive material is developed with a liquid toner, a tape having adhesive properties is pushed against the toner image, and the toner image is thereby peeled off from the photosensitive material. Thereafter, the tape is adhered to a final substrate.

Different techniques are proposed in, for example, Japanese Unexamined Patent Publication Nos. 2(1990)-278276 and 4(1992)-81786. In the proposed techniques, a toner image is perfectly transferred from a photosensitive material to an intermediate transfer film having adhesive properties, and the transferred toner image is again perfectly transferred to a substrate. Such steps are carried out for each of colors, and a full color image is thereby obtained.

The aforesaid processes, in which the toner image having been formed on the photosensitive material is temporarily transferred to the intermediate transfer material, have the advantages described below over the processes, in which the toner image having been formed on the photosensitive material is transferred directly to the final substrate.

Specifically, with the conventional processes, in which the toner image having been formed on the photosensitive material is transferred directly to the final substrate, it is not always possible to obtain a predetermined transfer efficiency due to non-uniformity in thickness of the substrate, non-uniformity in electrical characteristics of the substrate. Therefore, the problems occur in that an image having good image quality cannot easily be obtained. The processes, in which the toner image having been formed on the photosensitive material is temporarily transferred to the intermediate transfer material, have the drawbacks in that, since a plurality of transfer steps must be carried out, the size of the apparatus cannot be kept small. However, the processes, in which the toner image is temporarily transferred to the intermediate transfer material, have the advantages in that, since various characteristics of the intermediate transfer material can easily be optimized uniformly, the toner image transfer efficiency can be kept high, the toner image can be transferred uniformly and reliably, and an image having good image quality can be formed.

The advantages described above are important particularly when a full color image having good image quality is to be formed. Specifically, if the transfer efficiency is not uniform, when multi-color images are formed one upon another, desired colors cannot be obtained ultimately. Also, with the processes utilizing the intermediate transfer material, since the transfer to the final substrate can be carried out separately, the advantages can be obtained in that the transfer can be carried out to a wide variety of substrate materials, such as paper and plastic materials. As described above, the processes utilizing the intermediate transfer material are suitable for the formation of a full color image having good image quality and can be employed appropriate in the method and apparatus for forming photographic images in accordance with the present invention.

Preferable toners, techniques for transferring and fixing a toner image to a final substrate, and characteristics of the final substrate will be described hereinbelow. Ordinarily, as for a liquid toner, it is easy to keep the average toner particle diameter smaller than 1 μm. It is well known that the graininess of the toner image, which is obtained from such liquid development, is markedly better than the graininess of a toner image obtained with a dry toner having an average toner particle diameter of approximately 5 μm and is close to the graininess of a sliver halide photograph ordinarily, an image formed with the electrophotographic techniques, which looks rough, is due to, basically, large toner particle sizes, which yield bad graininess of the image. In order for a high-gradation image to be formed with smooth gradation, it is efficient and appropriate to keep the toner particle sizes small. However,the toner is not limited to the liquid toner. Also, it is well known that the image quality of the image obtained with the electrophotographic techniques depends markedly upon the characteristics of the toner, the characteristics of the final substrate, and the technique for transferring and fixing the toner image to the final substrate.

Coated paper, which has been subjected to a smoothing process for enhancing the accurate color reproduction and the gloss, is described in, for example, Japanese Patent Publication Nos. 5(1993)-82939 and 5(1993)-82940. Also, a color toner for obtaining an image free from non-uniformity in gloss, a heating and fixing step, and the like, are disclosed in, for example, Japanese Unexamined Patent Publication No. 8(1996)-194349. In an electrophotographic image, the amount of the toner adhered varies for a high image density portion and a low image density portion, and therefore a concave-convex image (a relief) with the toner is apt to be formed after toner fixing. Methods of preventing such problems are disclosed in, for example, Japanese Unexamined Patent Publication No. 8(1996)-194394 and Japanese Patent Application Publication Nos. 4(1992)-501925 and 5(1993)-500869. Further, a method, wherein the efficiency, with which a color toner is transferred from an intermediate transfer member to a final substrate, is enhanced by using a transparent material, accurate color reproduction is thereby enhanced, and a glossy finish quality is thereby obtained, is disclosed in, for example, Japanese Unexamined Patent Publication No. 5(1993)-281863. As described above, enhancement of the image gloss, reduction in gloss non-uniformity, enhancement of color reproducibility, reduction in relief, and enhancement of sharpness are essential for obtaining an electrophotographic image having good image quality. The techniques described above may also be employed in the method and apparatus for forming photographic images in accordance with the present invention. However, the method and apparatus for forming photographic images in accordance with the present invention are not limited to the aforesaid disclosed techniques.

A desirable image-wise exposure technique will be described hereinbelow. In the method and apparatus for forming photographic images in accordance with the present invention, the R, G, and B three-color image signals are detected by the CCD image sensor and converted by the analog-to-digital converter into digital image signals. When necessary, image processings, such as shading compensation, sharpness emphasis, gamma compensation, and color density gradation transform, are carried out on the digital image signals. The image-wise exposure in the image forming method described above is carried out in accordance with the digital image signals, which have been obtained from the image processings. Ordinarily, the image-wise exposure is carried out by the scanning with the laser beams. As the image reproducing technique, one of various image reproducing techniques may be employed. As the image reproducing techniques, there have been known a density gradation (continuous gradation) technique, in which the intensity of the laser beam is modulated in accordance with the image density signal and the photosensitive material is scanned with the modulated laser beam, a pseudo-continuous tone technique, in which the image signal is expressed basically with binary dots and the apparent image density is varied by changing the number of dots per small unit area, and a technique, in which a continuous tone image is reproduced by using a line screen that is known in the field of the printing technology.

The density gradation technique is described in, for example, U.S. Pat. No. 4,754,294. In order for a high-gradation image accurately reflecting the original image to be obtained with this technique, it is important to eliminate the problems with regard to the image density reproducibility at a highlight portion, which often occur with the electrophotography, by perfectly transferring the toner image from the photosensitive material drum.

The pseudo-continuous tone technique is popular in the field of electrophotography, and various methods utilizing it have been proposed. This technique substantially has the drawbacks in that, since high gradation and high resolution have the trade-off relationship, it is not always possible to enhance both of the gradation and the resolution, the drawbacks in that noise, such as a texture not present in the original image or a pseudo-contour, is apt to occur, and the drawbacks in that, in the cases of a full color image, the ways, in which the dots overlap one upon another, vary in accordance with the accuracy, with which multi-color images are superposed one upon another, and a desired color cannot be obtained particularly at a highlight portion. Various techniques have heretofore been proposed in order to solve such problems. In the method and apparatus forming photographic images in accordance with the present invention, techniques proposed in, for example, Japanese Unexamined Patent Publication Nos. 6(1994)-98184 and 8(1996)-163363 may be employed appropriately. However, the method and apparatus forming photographic images in accordance with the present invention are not limited to the use of such techniques.

As described above, with the electrophotographic type of laser printer, appropriate image processings are carried out on the digital full color image signals, which have been detected from photographic film, such that a full color image having good image quality equal to the image quality of a silver halide photograph or a printed image. Also, with the electrophotographic type of full color laser printer which should preferably be provided with the intermediate transfer material, the photosensitive material drum is exposed to the laser beam, which has been subjected to the intensity modulation in accordance with the color image signal of each color or has been subjected to the pulse width modulation for pseudo-gradation, and a latent image is thereby formed on the photosensitive material drum. The latent image is then developed with a liquid color toner or a dry color toner. Each time the toner image is thus formed, the toner image is transferred to the intermediate transfer material. The toner images of different colors are thus transferred successively to the intermediate transfer material and formed one upon another on the intermediate transfer material. The thus obtained composite color toner image is transferred and fixed to an appropriate final substrate. In this manner, the image forming method for obtaining a full color image having good image quality equal to the image quality of a silver halide photograph or a printed image can be provided.

Ink-jet types of digital printers will be described hereinbelow.

As the processes for obtaining a full color image with the ink-jet techniques, various processes have heretofore been proposed and put into practice. Ordinarily, in the processes for obtaining a full color image with the ink-jet techniques, an ink of a specific color is delivered as ink droplets or mist from a recording head in accordance with an image signal and is adhered as a dot or a set of dots to recording paper. The operation is carried out for a plurality of specific colors. Also, the operation is carried out with the scanning in two-dimensional directions. In this manner, a full color image is formed on the recording paper.

As basic techniques for the ink-jet recording, various techniques described below have been known. One technique is a thermal (bubble jet) technique. As described in, for example, Japanese Unexamined Patent Publication No. 8(1996)-104837, in the thermal technique, thermal energy is given to a recording head in accordance with an image signal, a portion of an ink contained in the recording head is thereby vaporized, and an ink droplet is delivered from a nozzle by the effects of the vaporization. In this manner, an image is recorded on recording paper. Another technique is a piezo technique. As described in, for example, Japanese Unexamined Patent Publication No. 6(1994)-256696, in the piezo technique, a portion of a recording head is constituted of a piezo-electric device, and a voltage is applied to the piezo-electric device in accordance with an image signal. The volume of an ink chamber is reduced by the deflection of the piezo-electric device, an ink droplet is delivered from a nozzle, and an image is thereby recorded on recording paper. A further technique is an ultrasonic technique. As described in, for example, Japanese Unexamined Patent Publication No. 5(1993)-238006, in the ultrasonic technique, ultrasonic waves are converged and applied to the surface of an ink liquid contained in an ink chamber, an ink droplet is thus delivered from the surface of the ink liquid, and an image is thereby recorded on recording paper. A still further technique is an electrostatic charge control technique. As described in, for example, Japanese Unexamined Patent Publication No. 62(1987)-56149, in the electrostatic charge control technique, electrostatically charged ink droplets, which are delivered successively from a nozzle by the effects of a piezo device, or the like, are electrostatically deflected in accordance with an image signal, and an image is thereby recorded on recording paper. Another technique is an electrostatic technique. As described in, for example, Japanese Unexamined Patent Publication No. 59(1984)-225984, in the electrostatic technique, an oil ink is used, a high voltage is applied across a recording head and recording paper, the ink is thus drawn from a nozzle and brought into contact with the recording paper, and an image is thereby recorded on the recording paper.

In the method and apparatus for forming photographic images in accordance with the present invention, one of the above-enumerated techniques may be employed.

As the inks for use in the various ink-jet techniques described above, various kinds of inks described below have been known. One kind of ink is a water-soluble ink. As described in, for example, Japanese Unexamined Patent Publication No. 3(1991)-258870, the water-soluble ink comprises a water-containing solvent and a water-soluble dye dissolved therein. Another kind of ink is an oil ink. As described in, for example, Japanese Unexamined Patent Publication Nos. 2(1990)-276871 and 4(1992)-248879, the oil ink comprises an organic solvent and a dye dissolved therein. A further kind of ink is a pigment ink. As described in, for example, Japanese Unexamined Patent Publication No. 4(1992)-214781, the pigment ink comprises a water-containing solvent and a pigment dispersed therein. A still further kind of ink is a micro-capsule ink. As described in, for example, Japanese Unexamined Patent Publication No. 1(1989)-170672, the micro-capsule ink contains a dye encapsulated in micro-capsules. Another kind of ink is a hot-melt ink. As described in, for example, Japanese Unexamined Patent Publication No. 4(1992)-117468, the hot-melt ink is a solid at normal temperatures. The hot-melt ink melts at high temperatures and is delivered in an ink-jet printer.

In the method and apparatus for forming photographic images in accordance with the present invention, one of the above-enumerated kinds of inks may be employed.

In order for a gray level image to be reproduced by using one of the various ink-jet techniques described above, gradation expression becomes necessary. As gradation recording techniques used in the various ink-jet techniques, various gradation recording techniques described below are known.

One gradation recording technique is a dot diameter control technique. As described in, for example, Japanese Unexamined Patent Publication No. 63(1988)-134250, in the dot diameter control technique, the size of an ink dot adhering to recording paper is controlled, and gradation is thereby obtained. In order for the dot diameter to be controlled, the diameter of a delivered ink droplet may be changed by controlling the width of a pulsed signal applied to a recording head or by utilizing a plurality of kinds of recording heads having different nozzle diameters. Alternatively, the dot diameter may be changed by changing the spreading of the ink with the control of the number of times of wet-on-wet ink shooting, which will be described later. (Such techniques are described in, for example, Japanese Patent Publication Nos. 54(1979)-21095 and 7(1995)-29446.) Another gradation recording technique is a wet-on-wet ink shooting technique. As described in, for example, Japanese Unexamined Patent Publication No. 3(1991)-231859, in the wet-on-wet ink shooting technique, the number of times of delivery of ink dots, which have a comparatively low concentration, to the same position on recording paper is controlled, and gradation is thereby obtained. A further gradation recording technique is a multi-concentration ink combining technique. As described in, for example, Japanese Patent Publication No. 2(1990)-14905, in the multi-concentration ink combining technique, a plurality of recording heads for delivering inks of the same color and having different concentration are utilized, and the image density is controlled by the selection of a recording head. A still further gradation recording technique is an ink mist technique. As described in, for example, Japanese Unexamined Patent Publication No. 5(1993)-57893, in the ink mist technique, an ink is delivered in a mist form from a recording head by utilizing ultrasonic vibration with a piezo-electric device, or the like, and the density of a set of fine dots on recording paper is changed by controlling the time, during which the ultrasonic vibration is applied. Another gradation recording technique is a matrix technique. As described in, for example, Japanese Unexamined Patent Publication No. 64(1989)-47553, in the matrix technique, one picture element on recording paper is constituted of m×n number of dots, which are arrayed in a matrix-like form, and the mean image density is controlled by adjusting the way, in which the dots located in the matrix are filled up. In order for the dots located in the matrix to be filled up, one of various techniques, such as an error diffusion technique, a Bayer type systematic dizzier technique, and density pattern technique may be employed.

As described in, for example, Japanese Patent Publication No. 5(1993)-46744, the above-enumerated gradation recording techniques may be combined appropriately. In the method and apparatus for forming photographic images in accordance with the present invention, the above-enumerated gradation recording techniques may be employed alone, or a combination of two or more of them may be employed.

In order for picture elements arrayed in two-dimensional directions are to be recorded on recording paper with the aforesaid ink-jet techniques, it is necessary for the recording head to be scanned in two-dimensional directions with respect to the recording paper. As the scanning techniques, various scanning techniques are known. In one scanning technique, as described in, for example, Japanese Patent Publication No. 5(1993)-46744, a recording head having been set on a carriage is mechanically scanned in the main scanning direction, and recording paper is conveyed in the sub-scanning direction. In another scanning technique, as described in, for example, Japanese Patent Publication No. 1(1989)-59111, the main scanning direction and the sub-scanning direction in the aforesaid technique are exchanged. Specifically, recording paper is set on a rotatable drum, and a recording head is moved with threads, or the like. In a further scanning technique, as described in, for example, Japanese Unexamined Patent Publication No. 5(1993)-57893, a multi-nozzle wide-width recording head is located along the main scanning direction, the recording along the main scanning direction is carried out simultaneously without mechanical scanning being carried out, and recording paper is conveyed in the sub-scanning direction.

In the method and apparatus for forming photographic images in accordance with the present invention, one of the aforesaid scanning techniques may be employed.

As recording paper for use in the aforesaid various ink-jet techniques, various kinds of recording paper described below are known. One kind of recording paper is a "pictrico sheet," as described in, for example, Japanese Unexamined Patent Publication No. 62(1987)-111782. This recording sheet has a porous particle layer on a substrate and has the feature in that little blotting of the ink occurs after the recording. Another kind of recording paper is a polymer-coated sheet, as described in, for example, Japanese Unexamined Patent Publication No. 7(1995)-179032. This recording sheet has a layer, which contains a hydrophilic resin, on a substrate.

A further kind of recording paper is a recording sheet, which has a substrate constituted of resin-coated paper, as described in, for example, Japanese Unexamined Patent Publication No. 7(1995)-179032. Besides the recording sheet described in this publication, there has also been known a recording sheet, which comprises a substrate having been coated with, for example, apolyolefin, and at least two coating layers, preferably three coating layers overlaid upon the substrate. At least one layer among the coating layers contains at least one kind of polymer represented by General Formula (1), (2) or (3) shown below.

General Formula (1)

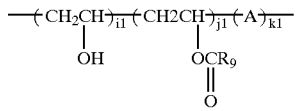

wherein $R_9$ represents an alkyl group having 1 to 4 carbon atoms, and A represents a repeating unit of a copolymerizable ethylenically unsaturated monomer. Also, i1, j1, and k1 represent the mol percentage ratios of the respective constituents, wherein i1+j1+k1=100, i1 takes a value falling within the range of 50 to 100, j1 takes a value falling within the range of 0 to 50, and k1 takes a value falling within the range of 0 to 30.

General Formula (2)

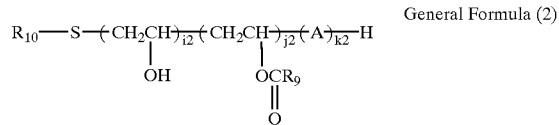

wherein $R_{10}$ represents an alkyl group having at least 8 carbon atoms or a phenyl group, $R_9$ represents an alkyl group having 1 to 4 carbon atoms, and A represents a repeating unit of a copolymerizable ethylenically unsaturated monomer. Also, i2, j2, and k2 represent the mol percentage ratios of the respective constituents, wherein i2+j2+k2=100, i2 takes a value falling within the range of 50 to 100, j2 takes a value falling within the range of 0 to 50, and k2 takes a value falling within the range of 0 to 30.

General Formula (3)

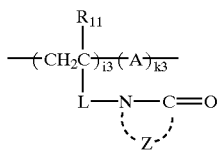

wherein $R_{11}$ represents a hydrogen atom or an alkyl group having 1 to 4 carbon atoms, A represents a repeating unit of a copolymerizable ethylenically unsaturated monomer, Z represents an atom group necessary for forming a pyrrolidone ring, an oxazolidone ring, or a lactam ring, and L represents a single bond, —CO—, —COO(CH$_2$)$_n$—(where n is an integral number of 1 to 5), or —CONR$_{12}$(CH$_2$)$_n$— (where n is an integral number of 1 to 5, and $R_{12}$ represents a hydrogen atom or an alkyl group having 1 to 4 carbon atoms). Also, i3 and k3 represent the mol percentage ratios of the respective constituents, wherein i3+k3=100, i3 takes a value falling within the range of 10 to 100, and k3 takes a value falling within the range of 0 to 90.

However, in General Formulas (1), (2), and (3) shown above, A does not contain a tertiary amino group and a quaternary amino group. Also, at least one layer among the aforesaid coating layers should preferably contain at least one kind of polymer, which contains a polyvinyl alcohol unit in a proportion falling within the range of 60 mol % to 95 mol %. Further, at least one layer among the aforesaid coating layers should preferably contain a matting agent having a diameter falling within the range of 3 μm to 30 μm, preferably a diameter falling within the range of 10 μm to 30 μm.

In the method and apparatus for forming photographic images in accordance with the present invention, one of various kinds of recording paper described above may be employed.

Besides the recording sheets described above, it is also possible to employ paper ordinarily used for prints, hard copies, and the like, such as printing paper, copying paper, OHP sheets, postcards. Plastic sheets, cloths, and the like, may also be employed.

As described above, with the ink-jet type of laser printer, from the digital full color image signals, which have been detected from photographic film, a full color image having good image quality equal to the image quality of a silver halide photograph or a printed image can be obtained. Also, full color images having good image quality equal to the image quality of a silver halide photograph or a printed image can be formed on various appropriate recording sheets by carrying out appropriate image processings and using appropriate kinds of inks, an appropriate gradation recording technique, and an appropriate scanning mechanism.

A thermal sublimative print-through type of digital printer, which may be employed in the method and apparatus for forming photographic images in accordance with the present invention, will be described hereinbelow.

As for the thermal sublimative print-through technique, various techniques have heretofore been proposed and put into practice. Ordinarily, in the full color image forming method utilizing the thermal sublimative print-through technique, an ink sheet, which contains a thermally migrating dye, is heated in accordance with a digital image signal, and the dye is thereby transferred to an image receiving sheet. In this manner, a full color image is obtained.

As disclosed in, for example, Japanese Unexamined Patent Publication No. 6(1994)-106861, the thermally migrating dye should preferably has a diene group or a dienophile group, and the image receiving sheet should preferably contain a dienophile compound or a diene compound. Alternatively, as disclosed in, for example, Japanese Unexamined Patent Publication No. 8(1996)-224966, the thermally migrating dye may be a chelatable dye, and the image receiving sheet may contain a metal ion supply compound. As another alternative, as disclosed in, for example, Japanese Unexamined Patent Publication No. 8(1996)-276673, the thermally migrating dye may contain a reactive amino group. In such cases, the image receiving sheet should preferably contain a polymer, which contains an alkyl acrylamide glycolate alkyl ether group. Also, as described in, for example, Japanese Unexamined Patent Publication No. 5(1993)-162473, the substrate of the image receiving sheet should preferably be polyethylene-coated paper. Alternatively, as described in, for example, Japanese Unexamined Patent Publication No. 8(1996)-99472, the substrate of the image receiving sheet may comprise a micro-voided thermoplastic core layer and a thermoplastic surface layer substantially free from voids, which layers are laminated together.

In a different type of digital printer, a heat-development photosensitive material is exposed to a laser beam in accordance with a digital image signal. The exposed heat-development photosensitive material is then superposed upon an image receiving material, and the image having been recorded by the exposure to the laser beam is developed with heat and transferred to the image receiving material. In this manner, the image is formed on the image receiving material. Such a type of digital printer may also be employed in the method and apparatus for forming photographic images in accordance with the present invention. An example of such a type of digital printer is Pictrography 3000 supplied by Fuji Photo Film Co., Ltd.

As described above, in various digital printers, a photosensitive material, which serves as a final substrate, or a different type of photosensitive material is exposed to light, and an image is thereby formed on the photosensitive material. The means for exposure is not limited to the means for scanning with the laser beam and may be selected from various other means, with which a light beam can be modulated in units of a single picture element in accordance with an image signal. For example, an LED array may be utilized as the light source, the intensity of light emitted by each LED may be controlled, and the modulation may thereby be carried out. Alternatively, a spatial modulation device (a mirror array device) may be utilized. With the mirror array device, a plurality of small mirrors are located in a two-dimensional array form, and the orientation of each mirror is controlled. In this manner, the direction, to which the recording light is reflected, is changed, and the impingement of the recording light upon the photosensitive material is controlled. As another alternative, liquid crystal cells may be located in a two-dimensional array form, and the transmittance or the reflectivity of each cell may be controlled. In this manner, the direction, to which the recording light passes or is reflected, is changed, and the impingement of the recording light upon the photosensitive material is controlled. As a further alternative, small mirrors may be located in a line, instead of being arrayed in two-dimensional directions, and the recording light may be irradiated linearly to the photosensitive material. Also, the photosensitive material may be moved with respect to the recording light and in a direction, which is approximately normal to the exposure line, and a two-dimensional image may thereby be recorded.

As a different example of the technique for producing light for digital exposure, a light emitting type of image display device may be utilized, and the light having been modulated directly by the image display device may be radiated out from the image display device. Alternatively, a light receiving type of image display device, in which the light irradiated toward the photosensitive material is subjected to spatial modulation and utilized as the light for exposure, may be utilized. Examples of the light emitting types of image display devices include a cathode ray tube (CRT) display device, aplasma display (PDP) device, an electroluminescent display (ELD) device, a vacuum fluorescent display (VFD) device, and a light emitting diode (LED) device. Examples of the light receiving types of image display devices include an electrochemical display (ECD) device, an electrophoresis display (EPID) device, a dispersed particle orientation type display (SPD) device, a colored particle rotation type display (TBD) device, and a PLZT display device.

Figure 5:
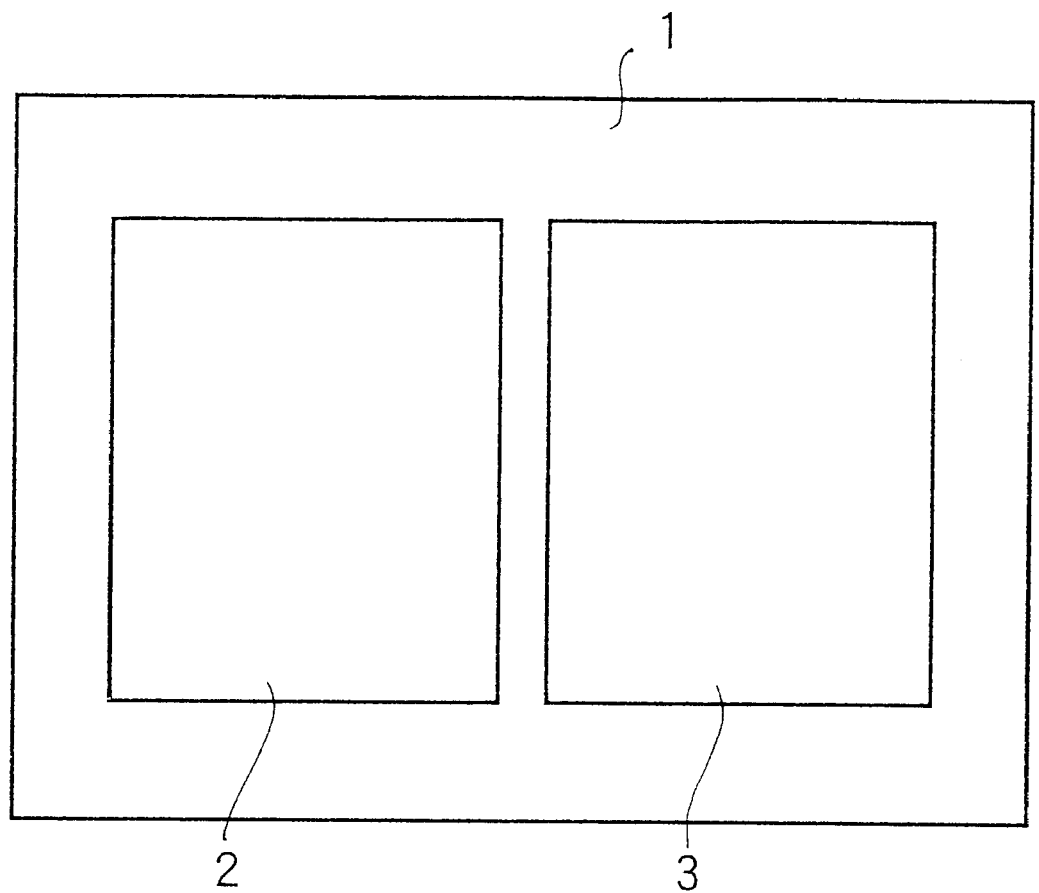
FIG. 5 is a plan view showing examples of photographic images obtained with the photographic image forming method in accordance with the present invention.

FIG. 5 is a plan view showing examples of photographic images obtained with the photographic image forming method in accordance with the present invention. As illustrated in FIG. 5, a standard color image 2, which has been obtained by carrying out standard image processing on a single original color image, and a processed image 3, e.g. a black-and-white image, which has been obtained by carrying out image processing under different processing conditions on the original color image, are printed on a single sheet of photosensitive material 1. Besides the image in which the tone of the original image has been changed in the manner described above, the processed image, which has been obtained by carrying out image processing under different processing conditions on the original color image, may be an image in which the gradation of the original image has been changed, an image in which the image trimming has been changed, an image which is obtained by enlarging a portion of the original image, or an image which is obtained by changing the combination of two or more of such processing conditions. Also, the processed image may be an image which has been obtained from a different kind of image processing, such as an image which has been obtained from a shutting light process, or an image which has been obtained by changing the conditions of the shutting light process.

Figure 6:
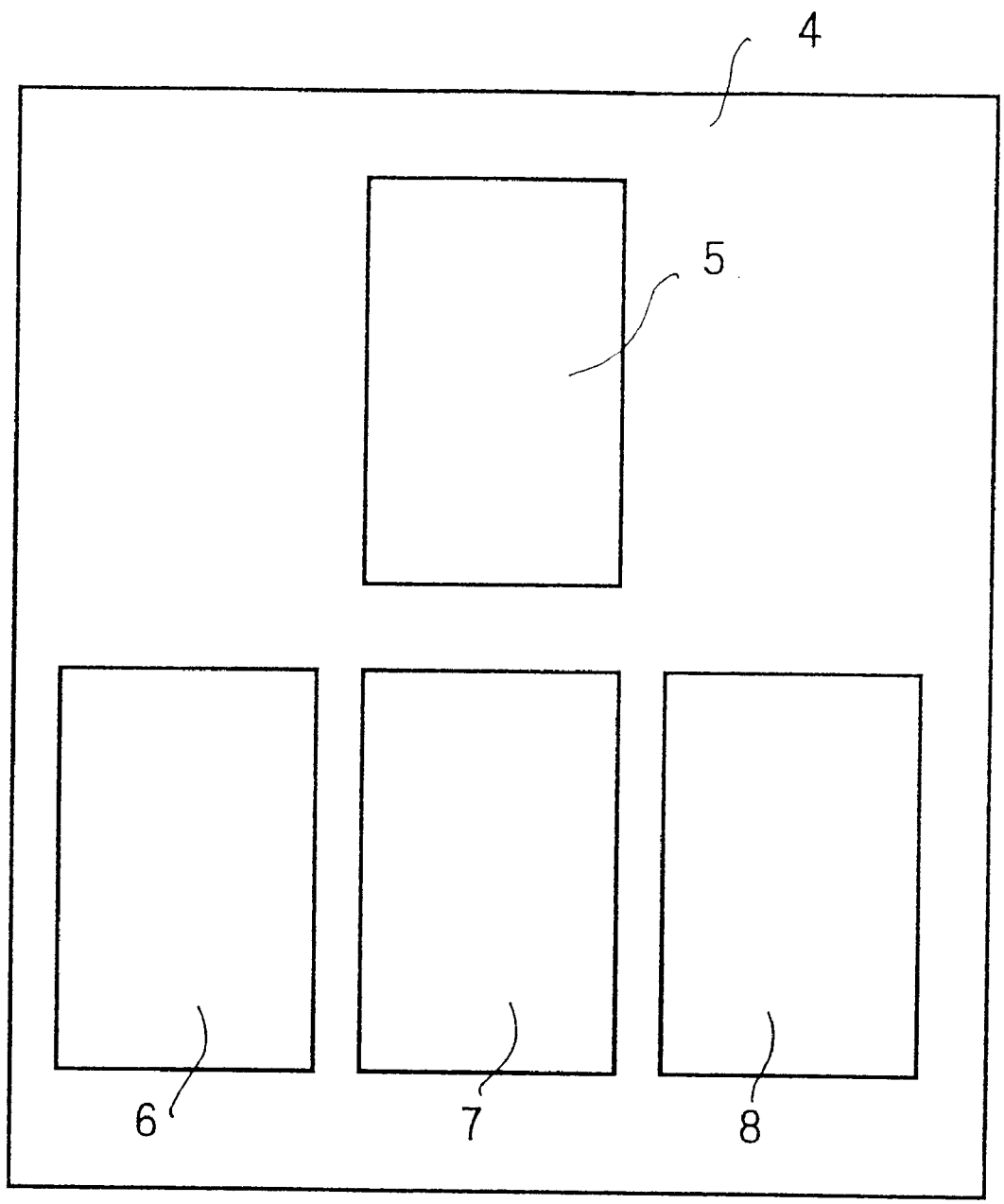
FIG. 6 is a plan view showing different examples of photographic images obtained with the photographic image forming method in accordance with the present invention.

FIG. 6 is a plan view showing different examples of photographic images obtained with the photographic image forming method in accordance with the present invention. In FIG. 6, a standard image 5 is printed on a single sheet of paper 4 together with three photographic images 6, 7, and 8, which have been obtained from various different kinds of image processings.

Actually, the method of printing the standard image together with at least one processed image, which has been obtained from a different kind of image processing or an image processing carried out under different processing conditions, can be carried out by the utilization of a recording medium, such as a CD-ROM, on which a program for printing a standard color image and at least one processed image on a single sheet of photosensitive material has been recorded, the standard color image being obtained by carrying out standard image processing on a single original color image, the processed image being obtained by carrying out image processing under different processing conditions on the original color image. Specifically, in a printer control device, which is loaded with a conventional program for carrying out the conventional method of printing a standard color image on a single sheet of photosensitive material, the recording medium, such as a CD-ROM, on which an improved version of program has been recorded, may be used. The improved version of program is added in order to print the standard color image and at least one processed image, which is obtained by carrying out image processing under different processing conditions on the same original color image, on the same photosensitive material.

What is claimed is:

1. A method of forming photographic images, the method comprising the steps of:

printing an entire color image and at least one processed image on a single sheet of photosensitive material, said entire color image being obtained by carrying out a first type of image processing on a single original color image, wherein said first type of image processing is a processing for altering at least one of image tone, image sharpness, image gradation, image trimming and image size enlargement scale factor, said processed image being obtained by carrying out a second type of image processing on said original color image;

wherein said second type of image processing is a processing for altering at least one other of said image tone, image sharpness, image gradation, image trimming and image size enlargement factor used in said first type of image processing.

2. A method as defined in claim 1, wherein said second type of image processing includes processing conditions for altering an image tone.

3. A method as defined in claim 1, wherein said second type of image processing includes processing conditions for altering image sharpness.

4. A method as defined in claim 1, wherein said second type of image processing includes processing conditions for altering image gradation.

5. A method as defined in claim 1, wherein said second type of image processing includes processing conditions for altering image trimming.

6. A method as defined in claim 1, wherein said second type of image processing includes processing conditions for altering an image size enlargement scale factor.

7. A method as defined in claim 1, wherein said second type of image processing includes processing conditions for altering a combination of at least two of an image tone, image sharpness, image gradation, image trimming, and an image size enlargement scale factor.

8. A method as defined in claim 1, wherein said original color image is given as a digital image signal, and said second type of image processing includes the conditions of image processing, which is carried out on said digital image signal.

9. An apparatus for forming photographic images, the apparatus comprising:
    means for forming an entire first color image and at least one second color image on a single sheet of photosensitive material,
    said first color image being obtained by carrying out a first type of image processing on a single original color image, wherein said first type of image processing is a processing for altering at least one of image tone, image sharpness, image gradation, image trimming and image size enlargement scale factor,
    said second color image being obtained by carrying out a second type of image processing on said original color image;
    wherein said second type of image processing is a processing for altering at least one other of said image tone, image sharpness, image gradation, image trimming and image size enlargement factor used in said first type of image processing.

10. An apparatus as defined in claim 9, wherein said means for forming said standard color image and said non-standard color image on a single sheet of photosensitive material is a digital exposure means, which forms the images with digital exposure.

11. An apparatus as defined in claim 9, wherein said second type of image processing includes processing conditions for altering an image tone.

12. An apparatus as defined in claim 9, wherein said second type of image processing includes processing conditions for altering image sharpness.

13. An apparatus as defined in claim 9, wherein said second type of image processing includes processing conditions for altering image gradation.

14. An apparatus as defined in claim 9, wherein said second type of image processing includes processing conditions for altering image trimming.

15. An apparatus as defined in claim 9, wherein said second type of image processing includes processing conditions for altering an image size enlargement scale factor.

16. An apparatus as defined in claim 9, wherein said second type of image processing includes processing conditions for altering a combination of at least two of an image tone, image sharpness, image gradation, image trimming, and an image size enlargement scale factor.

17. An apparatus as defined in claim 9, wherein said original color image is given as a digital image signal, and said second type of image processing includes the conditions of image processing, which is carried out on said digital image signal.

18. An apparatus for forming photographic images, the apparatus comprising:
    an entire color image and at least one processed image, which are printed on a single sheet of photosensitive material,
    said entire color image being obtained by carrying out a first type of image processing on a single original color image, wherein said first type of image processing is a processing for altering at least one of image tone, image sharpness, image gradation, image trimming and image size enlargement scale factor,
    said processed image being obtained by carrying out a second type of image processing on said original color image;
    wherein said second type of image processing is a processing for altering at least one other of said image tone, image sharpness, image gradation, image trimming and image size enlargement factor used in said first type of image processing.

19. An apparatus for forming photographic images, the apparatus comprising:
    a recording medium; and
    a program for printing an entire color image and at least one processed image on a single sheet of photosensitive material to be recorded on said recording medium,
    said entire color image being obtained by carrying out a first type of image processing on a single original color image, wherein said first type of image processing is a processing for altering at least one of image tone, image sharpness, image gradation, image trimming and image size enlargement scale factor,
    said processed image being obtained by carrying out a second type of image processing on said original color image;
    wherein said second type of image processing is a processing for altering at least one other of said image tone, image sharpness, image gradation, image trimming and image size enlargement factor used in said first type of image processing.

20. An apparatus for forming photographic changes, the apparatus comprising:
    a recording medium; and
    a program to be added to a printer control device to be recorded on said recording medium,
    said printer control device having been loaded with a program for printing an entire color image, which is obtained by carrying out a first type of image processing on a single original color image, on a single sheet of photosensitive material, wherein said first type of image processing is a processing for altering at least one of image tone, image sharpness, image gradation, image trimming and image size enlargement scale factor,
    said program to be added being a program for printing said entire color image and at least one processed image, which is obtained by carrying out a second type of image processing on said original color image, on said sheet of photosensitive material;
    wherein said second type of image processing is a processing for altering at least one other of said image tone, image sharpness, image gradation, image trimming and image size enlargement factor used in said first type of image processing.

21. A method of forming photographic images, the method comprising the steps of:
- obtaining an entire color image and at least one processed image from a single original color image; and
- printing said entire color image and said processed image on a photosensitive material,
- said entire color image being obtained by carrying out a first type of image processing on said original color image, wherein said first type of image processing is a processing for altering at least one of image tone, image sharpness, image gradation, image trimming and image size enlargement scale factor,
- said processed image being obtained by carrying out a second type of image processing on said original color image;
- wherein said second type of image processing is a processing for altering at least one other of said image tone, image sharpness, image gradation, image trimming and image size enlargement factor used in said first type of image processing.

22. An apparatus for forming photographic images, the apparatus comprising:
- means for obtaining an entire color image, which is obtained by carrying out a first type of image processing on a single original color image, wherein said first type of image processing is a processing for altering at least one of image tone, image sharpness, image gradation, image trimming and image size enlargement scale factor,
- means for obtaining at least one processed image, which is obtained by carrying out a second type of image processing on said original color image, and
- means for forming said entire color image and said processed image on a photosensitive material;
- wherein said second type of image processing is a processing for altering at least one other of said image tone, image sharpness, image gradation, image trimming and image size enlargement factor used in said first type of image processing.

23. An apparatus for forming photographic images, the apparatus comprising:
- a recording medium; and
- a program for printing an entire color image and at least one processed image to be recorded on said recording medium,
- said entire color image being obtained by carrying out a first type of image processing on a single original color image, wherein said first type of image processing is a processing for altering at least one of image tone, image sharpness, image gradation, image trimming and image size enlargement scale factor,
- said processed image being obtained by carrying out a second type of image processing on said original color image;
- wherein said second type of image processing is a processing for altering at least one other of said image tone, image sharpness, image gradation, image trimming and image size enlargement factor used in said first type of image processing.

24. A method of forming photographic images, the method comprising the steps of:
- displaying an entire color image and at least one processed image on a display screen of a single display device,
- said entire color image being obtained by carrying out a first type of image processing on a single original color image, wherein said first type of image processing is a processing for altering at least one of image tone, image sharpness, image gradation, image trimming and image size enlargement scale factor,
- said processed image being obtained by carrying out a second type of image processing on said original color image;
- wherein said second type of image processing is a processing for altering at least one other of said image tone, image sharpness, image gradation, image trimming and image size enlargement factor used in said first type of image processing.

25. A photographic image made by a method comprising:
- printing an entire color image and at least one processed image on a single sheet of photosensitive material, wherein said entire color image is obtained by carrying out a first type of image processing on a single original color image, wherein said first type of image processing is a processing for altering at least one of image tone, image sharpness, image gradation, image trimming and image size enlargement scale factor, and said processed image is obtained by carrying out a second type of image processing on said original color image; and
- wherein said second type of image processing is a processing for altering at least one other of said image tone, image sharpness, image gradation, image trimming and image size enlargement factor used in said first type of image processing.

* * * * *